United States Patent
Yamada et al.

(10) Patent No.: US 7,409,686 B2
(45) Date of Patent: Aug. 5, 2008

(54) METHOD OF CONSTRUCTING PROCESS WORKFLOW HAVING DECISION SUBPROCESSES AND ROUTINE SUBPROCESSES AND COMBINING SUBPROCESSES TO FORM ONE UNIT PROCESS

(75) Inventors: Shinjiro Yamada, Shinjuku-Ku (JP); Masayuki Nakao, Matsudo (JP); Tomohito Ohmori, Shinjuku-Ku (JP); Michiyo Kuwabara, Shinjuku-Ku (JP)

(73) Assignee: INCS, Inc., Tokyo (JP)

( * ) Notice: Subject to any disclaimer, the term of this patent is extended or adjusted under 35 U.S.C. 154(b) by 801 days.

(21) Appl. No.: 10/640,145

(22) Filed: Aug. 13, 2003

(65) Prior Publication Data
US 2004/0049487 A1    Mar. 11, 2004

(30) Foreign Application Priority Data
Aug. 15, 2002    (JP) ............................ 2002-236802
Feb. 7, 2003      (JP) ............................ 2003-031187

(51) Int. Cl.
G06N 5/04    (2006.01)
G06F 9/45    (2006.01)

(52) U.S. Cl. ........................... 718/102; 706/60; 717/149

(58) Field of Classification Search ................. 718/102; 717/120, 121, 123, 149; 705/11, 8; 704/245; 703/7, 14, 24; 706/60
See application file for complete search history.

(56) References Cited

U.S. PATENT DOCUMENTS

| | | | |
|---|---|---|---|
| 4,575,330 A | | 3/1986 | Hull |
| 5,913,925 A | * | 6/1999 | Kahle et al. .................. 717/149 |
| 7,330,844 B2 | * | 2/2008 | Stoyen ........................ 706/60 |
| 2003/0084016 A1 | * | 5/2003 | Norgaard et al. .............. 706/60 |

OTHER PUBLICATIONS

Methodical Restructuring of Complex Workflow Activities Ling Liu and Calton Pu 1998 IEEE.*
V. Atluri et al., "Modeling and Evaluation of Redesigning Methodologies for Distributed Workflows," Modeling, Analysis and Simulation of Computer and Telecommunication Systems, 2000, pp. 248-255, Proceedings 8th International Symposium on San Francisco, XP010515421.

(Continued)

Primary Examiner—Meng-Al T. An
Assistant Examiner—Mengyao Zhe
(74) Attorney, Agent, or Firm—Butzel Long

(57) ABSTRACT

Disclosed is a method of constructing and executing a process. A conventional process is minutely divided into minimum unit subprocesses, and the minutely divided subprocesses are classified into a decision subprocesses and a routine subprocess by whether they require decision-making. Any subprocess which is executable using the setup condition in a specific decision subprocess is classified into the routine subprocess in such a manner that the classified routine subprocess follows on the specific decision subprocess. One or a series of decision subprocesses are combined with one or a series of routine subprocesses which are executable on the condition of the completion of the decision subprocesses to form one unit process, and a job-support computer program is created to allow the plurality of subprocesses included in the one unit process to be successively executed. A plurality of subprocesses which are executable in accordance with common input data are detected from the minutely divided minimum unit subprocesses, and a job flow is constructed to allow the respective jobs in the plurality of subprocesses to be simultaneously initiated and executed in parallel. The present invention can drastically reduce the lead-time of a process while facilitating execution of the entire process with high efficiency.

10 Claims, 40 Drawing Sheets

OTHER PUBLICATIONS

U. Bilge, "An Integrated Computer-Aided Process Planning System for Injection Mold Manufacturing," Emerging Technologies and Factory Automation, 1996, pp. 123-129, IEEE Conference on Kauai, HI, XP010204107.

K. Dyer, "Stereolithography," Electro Electronic Conventions Management, Los Angeles, CA, vol. 15, May 1990, pp. 398-403, XP000173353.

A. Hull, "Stereolithography as a Tool for Prototype Moulds," Kunststoffe Europe, Carl Hanser verlag, Munchen, DE, No. 3 pp. 334-337, XP000173353.

L. Liu et al., "Methodical Restructuring of Complex Workflow Activities," Data Engineering, 14th International Conference on Orlando, FL, IEEE Computer Soc., pp. 342-350, XP010268336.

* cited by examiner

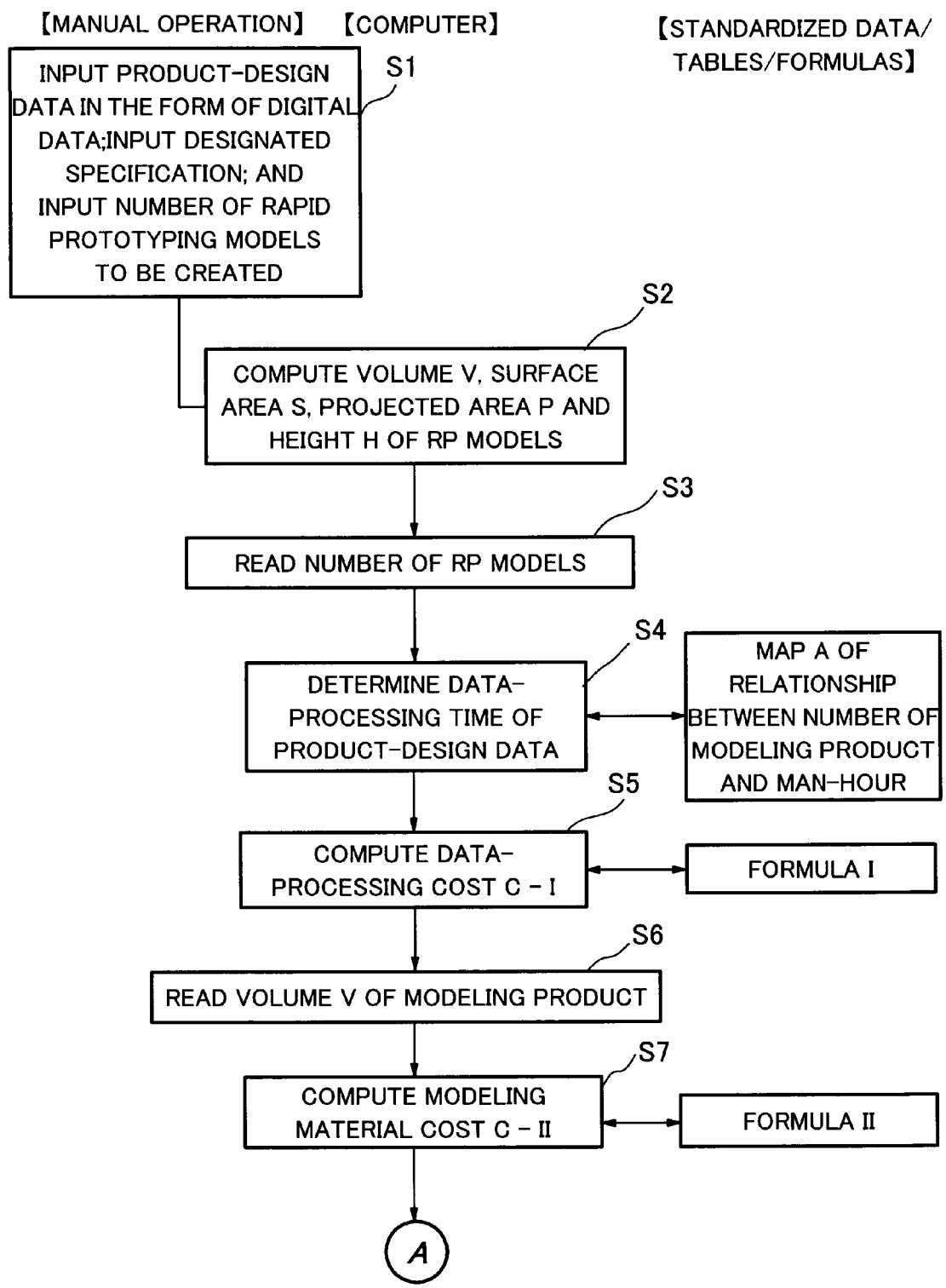

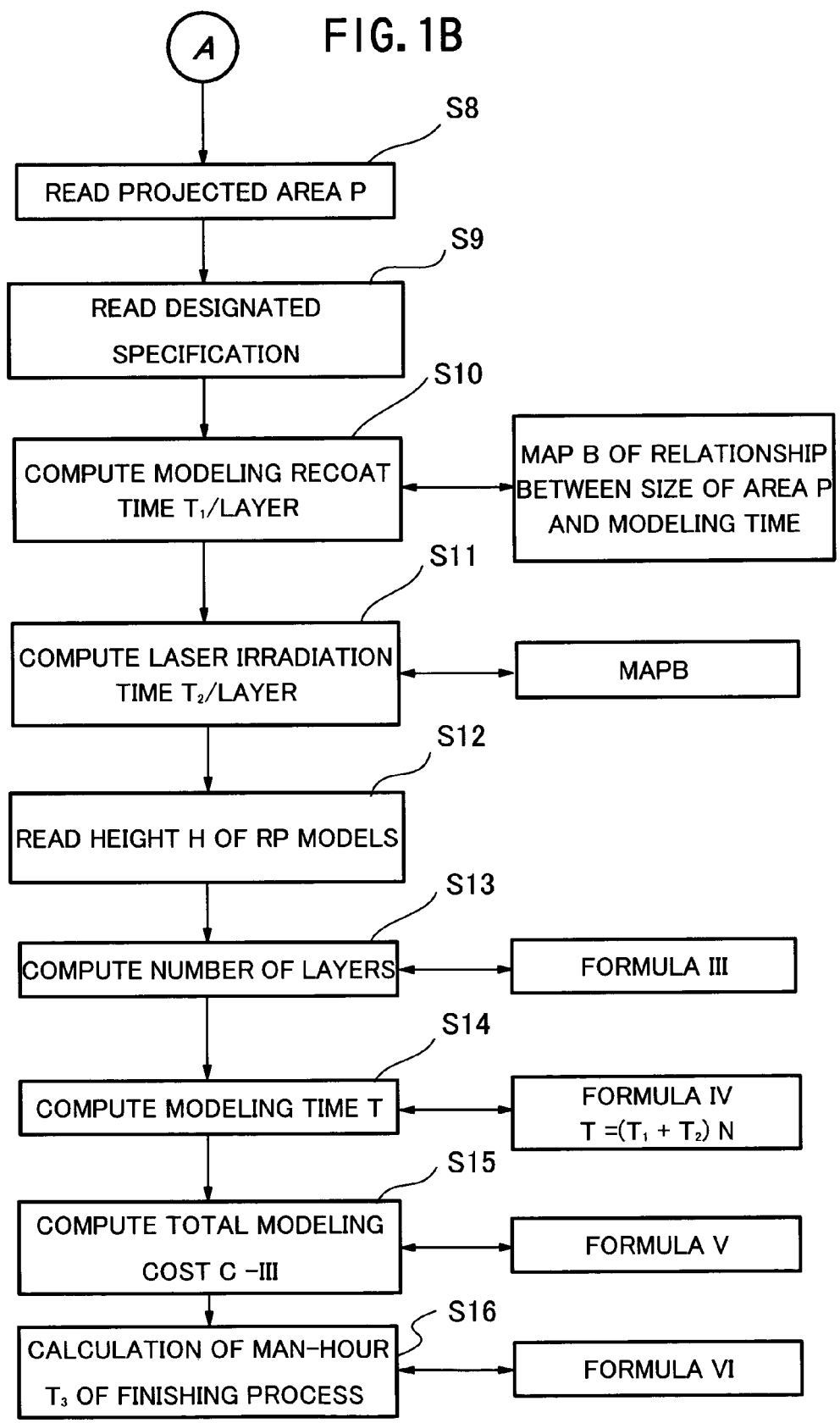

FIG. 2

MAP A

| NUMBER OF RP MODELS | MAN-HOUR |
|---|---|
| 1 | 2HR |
| 2 | 2HR |
| 3 | 3HR |
| 4 | 4HR |
| 5 | 5HR |

MAP B

| | BASIC MODELING TIME | RECOATER TIME | | | | LASER IRRADIATION TIME | | | |
|---|---|---|---|---|---|---|---|---|---|
| NORMAL | | <50 | <100 | <200 | 200~ | 50 | 100 | 200 | 500 |
| | 35sec | 2sec | 4sec | 8sec | 20sec | 10sec | 40sec | 160sec | 1,000sec |
| TRAP | 35sec | 6sec | 12sec | 24sec | 60sec | 10sec | 40sec | 160sec | 1,000sec |
| QUICK CAST | 45sec | 6sec | 12sec | 24sec | 60sec | 10sec | 40sec | 160sec | 1,000sec |

MAP C

| LEVEL | AREA(cm$^2$) | | | |
|---|---|---|---|---|
| | <50 | <100 | <200 | 200~ |
| A | 0H | 0H | 0H | 1H |
| B | 1H | 3H | 3H | 4H |
| C | 2H | 4H | 7H | 12H |
| D | 2H | 7H | 10H | 22H |
| E | 4H | 12H | 16H | 30H |

FIG. 3
(A)
CURRENT PROCESS
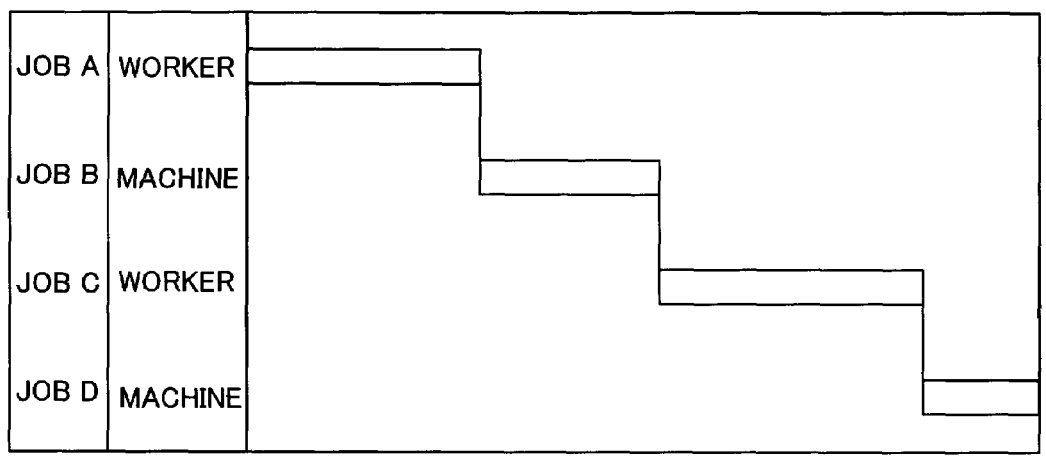
(B)
SEGMENTALIZATION
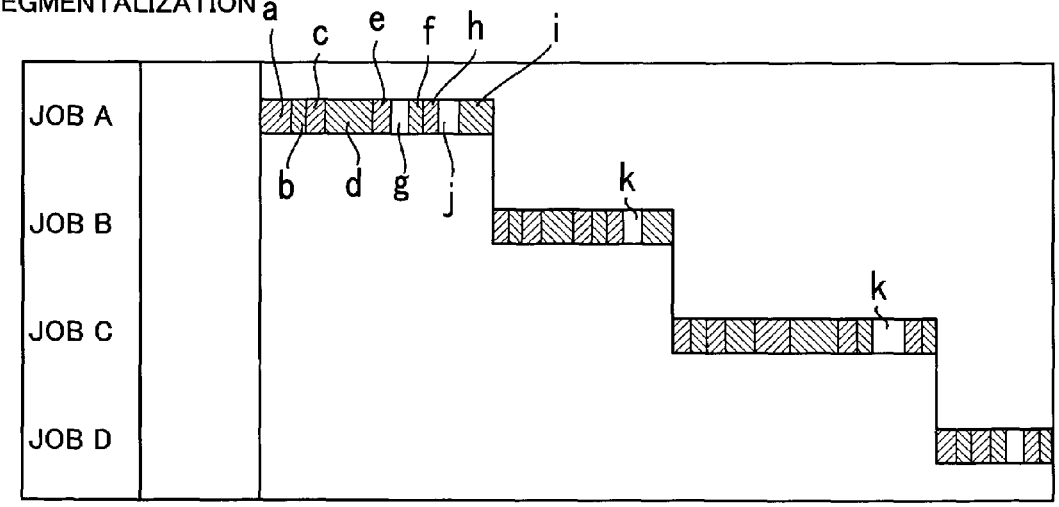

FIG. 4
(A)
REDUCTION IN NUMBER OF PROCESS BY STANDARDIZATION AND AUTOMATIZATION
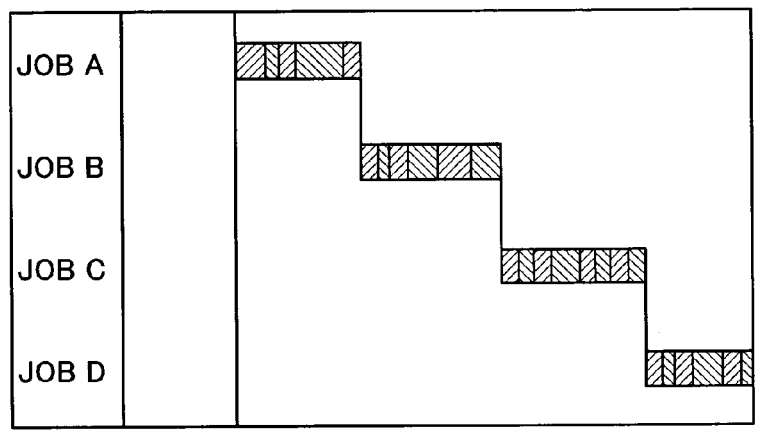
(B)
CONNECTION & RECONSTRUCTION OF PROCESS
SHARING OF INFORMATION AND MANAGEMENT USING IT
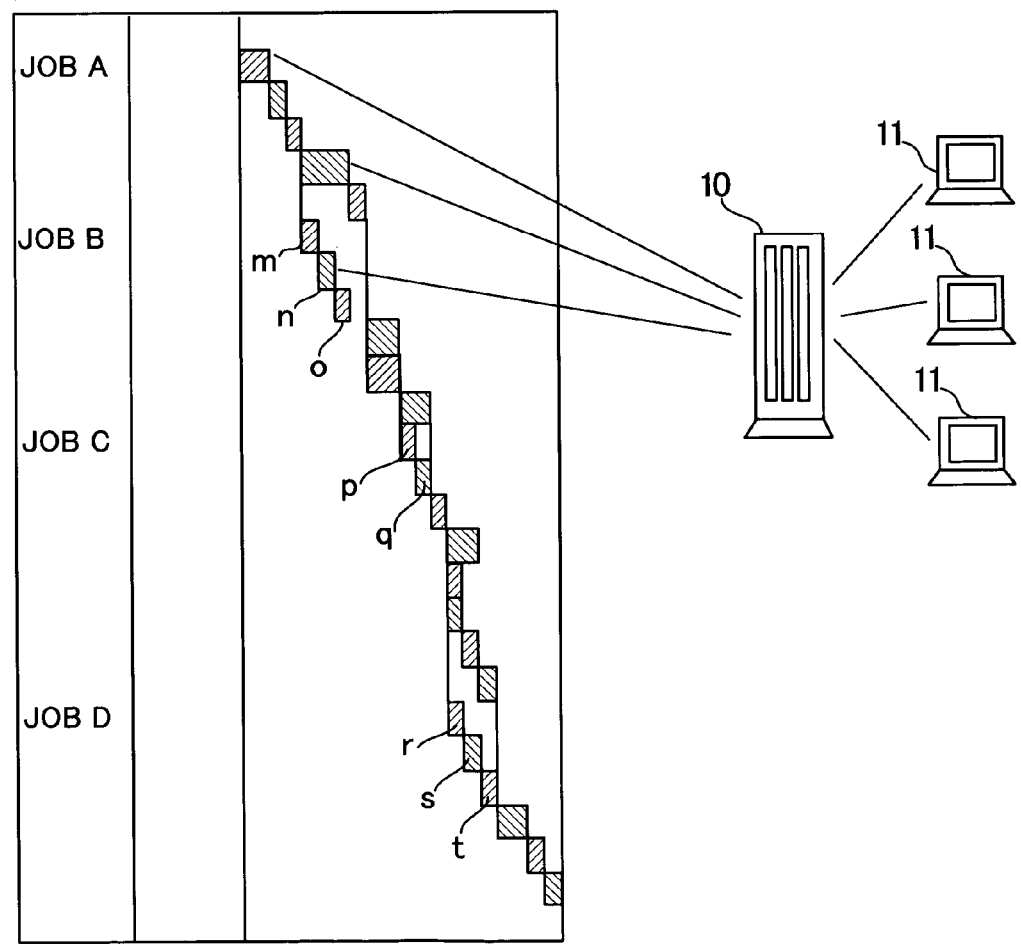

(B)

(A)          (B)

INCLINATION

| RESIN | d1 | t | w | TYPE OF INCLINATION |
|---|---|---|---|---|
| ABS | 4 | t1−0.2 | 3 | ONE SIDE |
| PC/ABS | 4 | t1−0.2 | 4 | ONE SIDE |
| PC | 6 | t1−0.2 | 4 | BOTH SIDES |
| PMMA | 6 | t1−0.2 | 4 | BOTH SIDES |

FIG. 28A
| MATERIAL NO | DIMENSION |
|---|---|
| SL-E10 | 150 × 15 × t10 |
| SL-E12 | 150 × 15 × t12 |
| SL-E15 | 150 × 15 × t15 |
| SL-F10 | 300 × 300 × t10 |
| SL-F12 | 300 × 300 × t12 |
| SL-F15 | 300 × 300 × t15 |
STANDARDIZED MATERIAL
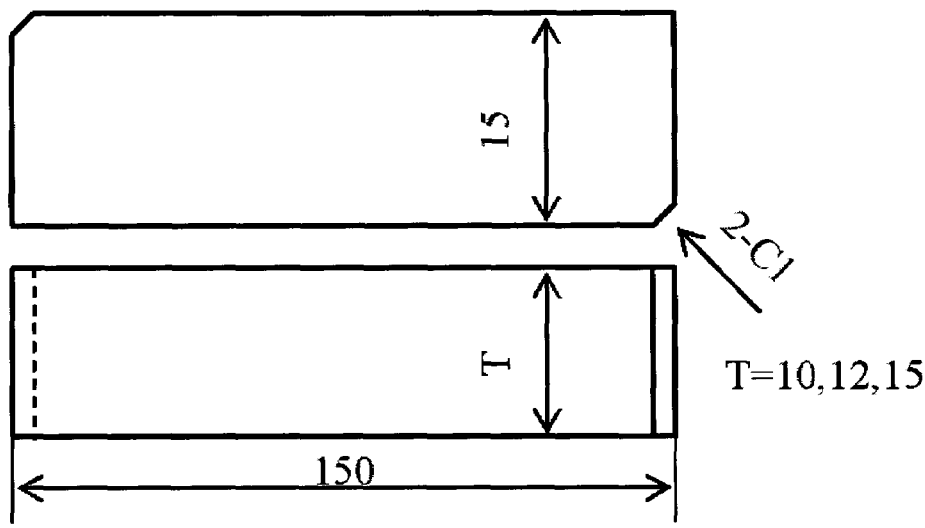
WIRE CUT MATERIAL
W: ANY GIVEN DIMENSION
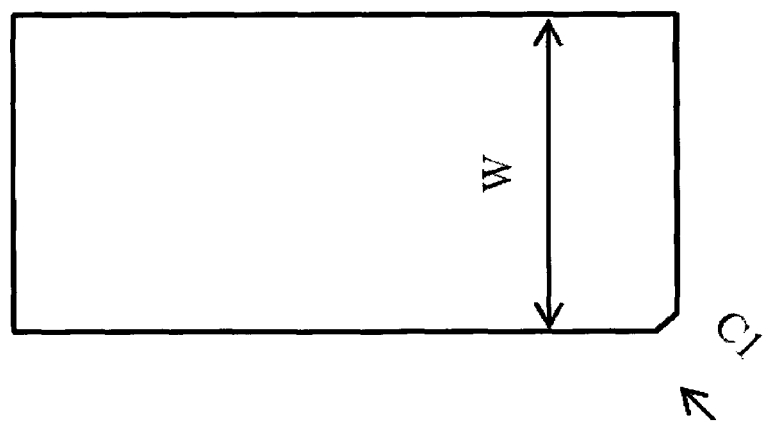

1. LIFTER WITH JAW  2. LIFTER W/O JAW

FOR LIFTER WITH JAW POCKET

| ANGLE | ACTUAL STROKE | MAXIMUM UNDERCUT |
|---|---|---|
| 3° | 1.04 | 0.54 |
| 5° | 1.74 | 1.24 |
| 7° | 2.45 | 1.95 |
| 10° | 3.52 | 3.05 |

CLEARANCE PRODUCT (I.E. RIBS): ACTUAL STROKE + 0.5

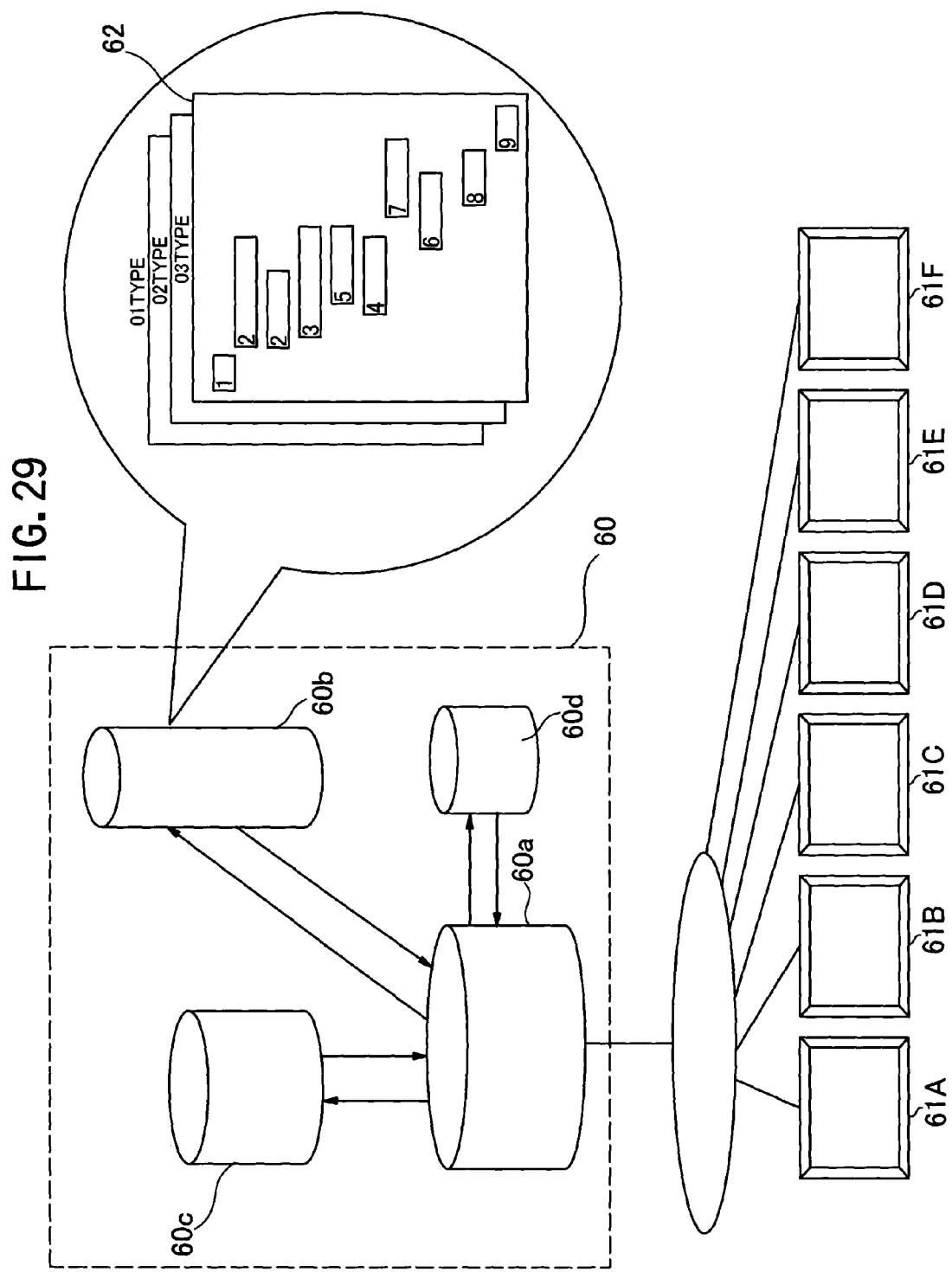

FIG. 30E
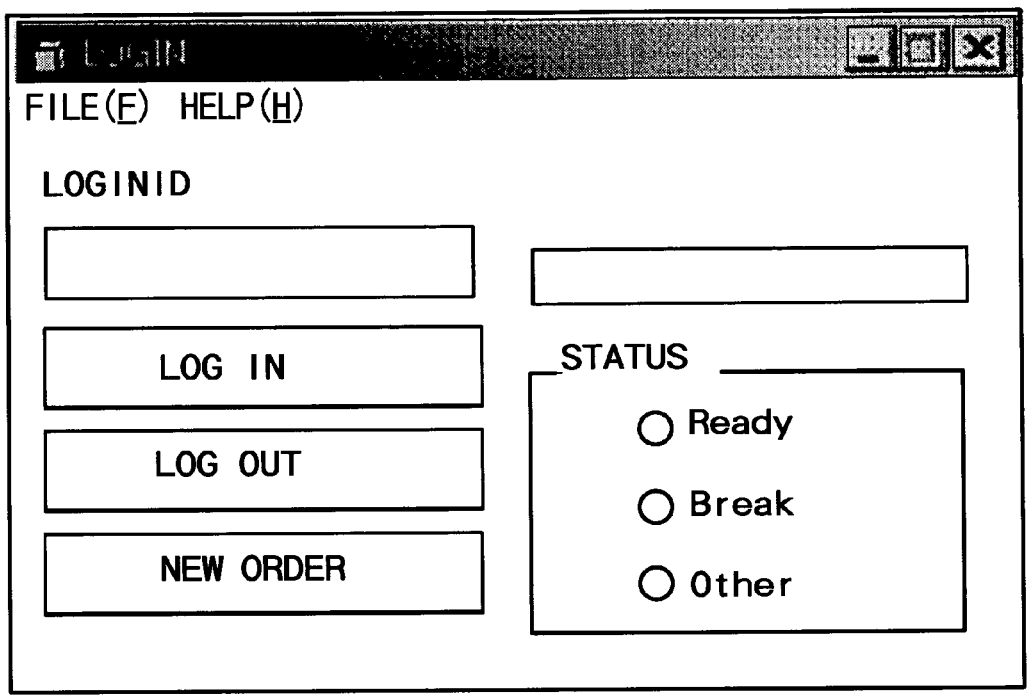
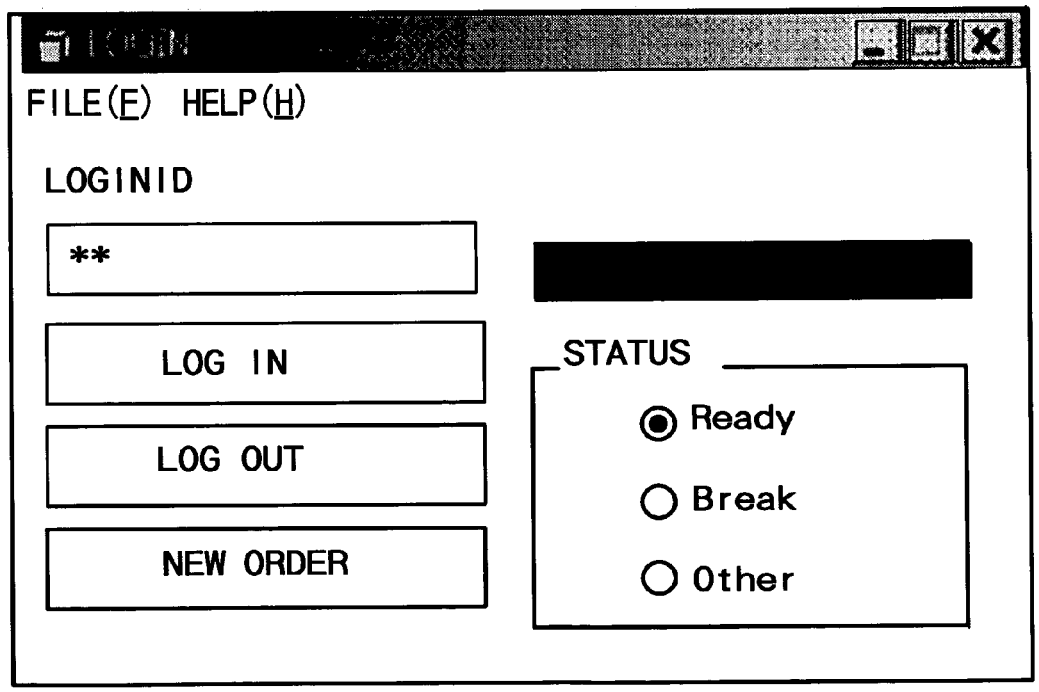

FIG. 30F

| DATA CORRECTION① |
|---|

☐ DATA CORRECTION①

ORDER INFORMATION

Order NO. ⬜
Customer ⬜
PRODUCT NAME ⬜
DELIVERY DATE ⬜

Application

- KATACAD
- KATACAM
- KATADB
- ⬜

COMPONENT INFORMATION

COMPONENT NO. ⬜
COMPONENT NAME ⬜

Check  History

| | CHECK LIST |
|---|---|
| ☐ ○ | CHECK DISCONTINUOUS SURFACES BY "GEOMETORY CHECK/SOLID CHECK" COMMAND |
| ☐ ○ | CORRECT DISCONTINUOUS SURFACES |
| ☐ ○ | CHECK THE COMPLETION OF CORRECTION OF ENTIRE DISCONTINUOUS SURFACES BY "GEOMETORY CHECK/SOLID CHECK" COMMAND |

Status

○ Ready ○ Break ○ Other

S nd | Suspend

FIG. 30G

```
SOLID CHECK

DISPLAY

☑ SOLID              0              OK
    ☑ FACE               1              RESET
    ☑ CURVE (GENERAL)    0              CANCEL
    ☐ CURVE
      (LINE ON PLANE)    0
```

FIG. 30H

DATA CORRECTION①

☐ DATA CORRECTION①

ORDER INFORMATION

Order NO. [ ]
Customer [ ]
PRODUCT NAME [ ]
DELIVERY DATE [ ]

Application

- KATACAD
- KATACAM
- KATADB
- [ ]

COMPONENT INFORMATION

COMPONENT NO. [ ]
COMPONENT NAME [ ]

Check | History

| | CHECK LIST |
|---|---|
| ☐ ○ | CHECK DISCONTINUOUS SURFACES BY "GEOMETORY CHECK/SOLID CHECK" COMMAND |
| ☐ ○ | CORRECT DISCONTINUOUS SURFACES |
| ☐ ○ | CHECK THE COMPLETION OF CORRECTION OF ENTIRE DISCONTINUOUS SURFACES BY "GEOMETORY CHECK/SOLID CHECK" COMMAND |

Status

○ Ready  ○ Break  ○ Other

S nd | Suspend

FIG. 301

```
LAYOUT
  ☐ LAYOUT
  ORDER INFORMATION
    Order NO.     [        ]
    Customer      [        ]           Application
    PRODUCT NAME  [        ]
    DELIVERY DATE [        ]            [ KATACAD ]
                                        [ KATACAM ]
  COMPONENT INFORMATION
                                        [ KATADB  ]
    COMPONENT NO.   [        ]
    COMPONENT NAME  [        ]          [         ]

[ Check ]  [ History ]

☐   2002/1/11   12:00  RECEIPT OF ORDER
        ☐ SHRINKAGE CHECK TABLE

INPUT/LINK HISTORY
    CONTENT
    OF HISTORY  [          ]           [ INPUT ]
                                        [ LINK  ]

Status
    ○ Ready   ○ Break   ○ Other     [ Send ]  [ Susp nd ]
                                     [    ]   [        ]
```

FIG. 30J

| | X | Y | Z | |
|---|---|---|---|---|
| SIZE BEFORE ADDING SHRINKAGE | | | | |
| SIZE AFTER ADDING SHRINKAGE | | | | |
| AFTER/BEFORE RATIO | | | | |
| | | | | |

LAYOUT

SHRINKAGE  0.5%

FIG. 30K

LAYOUT

☐ LAYOUT

ORDER INFORMATION

Order NO. ☐
Customer ☐
PRODUCT NAME ☐
DELIVERY DATE ☐

Application

| KATACAD |
| KATACAM |
| KATADB |
| |

COMPONENT INFORMATION

COMPONENT NO. ☐
COMPONENT NAME ☐

[ Check ] [ History ]

| | CHECK LIST |
|---|---|
| ☑ | ○ CHECK SHRINKAGE IN[HISTORY] |
| ☐ | ○ ADD SHRINKAGE |
| ☐ | ○ PARTING LINE STUDY/ LAYOUT |
| ☐ | ○ CREATE PARTING SURFACES |
| ☐ | ○ CREATE PARTING LINES/SEPARATE UPPER AND LOWER DIES |

Status

○ Ready   ○ Break   ○ Other

FIG. 30L

| COMPONENT NAME | VERSION | STATUS |
|---|---|---|
| CORE01 | NOT STORED | |
| CAVI 01 | NOT STORED | |

SAVE  CANCEL

METHOD OF CONSTRUCTING PROCESS WORKFLOW HAVING DECISION SUBPROCESSES AND ROUTINE SUBPROCESSES AND COMBINING SUBPROCESSES TO FORM ONE UNIT PROCESS

FIELD OF THE INVENTION

The present invention relates to a method of constructing and executing a process. The term "process" herein is not limited to a production process as ordinary meaning, but has a broad meaning including a design or engineering process, a management process and any other general operation processes. The present invention is directed to a process construction/execution method capable of executing a process under the support of a computer with significantly high efficiency to reduce the lead-time of the process in its entirety.

BACKGROUND OF THE INVENTION

In various fields, a number of proposes and actual attempts have been made to reduce the lead-time of a process. Conventional techniques of lead-time reduction are intended to shorten or reduce individual operations, tasks, jobs or subprocess constituting a process, but not to reduce the lead-time through a technique of reviewing the entire construction of a process to reorganize subprocesses or cut useless subprocesses according to need. Thus, the conventional process includes a number of hidden, unrecognizable useless jobs. In fact, considerable jobs which could otherwise be executed in parallel are executed in series, and useless waiting or holding period involves between subprocesses. In addition, the conventional process includes a number of decision subprocesses requiring millions of parameters, and the decision-making in each of such subprocesses generally relies on a skilled specialist. The conventional process also has a problem of including many similar subprocesses to be repeatedly executed. Heretofore, it has not been achieved to effectively reduce the entire process time due to no effective means for detecting such problems.

SUMMARY OF THE INVENTION

It is a primary object of the present invention to organize and reconstruct subprocesses constituting a process in their entireties based on intensive analysis of a conventional process execution method, to allow the lead-time of a process to be drastically reduced as compared to the conventional methods.

It is another object of the present invention to provide a method of constructing and executing a process, capable of simplifying a decision job which has relied on a skilled person, and drastically reducing the number of subprocesses requiring decision-making as compared to the conventional methods.

It is still another object of the present invention to thoroughly eliminate the unnecessary subprocesses in the conventional process execution methods to provide a drastically reduced process execution time.

In order to achieve the above objects, according to the present invention, a process is classified into a decision subprocess and a routine subprocess, depending on whether each of subprocesses constituting the process requires decision-making. The need for decision-making herein means the need for setting up unknown condition in the execution of a job in the subprocess.

The process is segmentized into a number of minimum unit subprocesses. In present invention, any subprocess executable using a condition set up in specific one of the decision subprocesses is classified into the routine subprocess in such a manner that the classified routine subprocess follows on the specific decision subprocess. By this method of process construction, the number of the decision subprocesses can be reduced and the lead-time of the entire process can be drastically short. The information of the process is then stored into a storing section of a computer in the form of computer-readable data. In accordance with these data, one or a series of the decision subprocesses are combined with one or a series of the routine subprocesses executable on the condition of the completion of corresponding the decision subprocesses to form one unit process, and a job-support computer program is created to allow the plurality of subprocesses included in the one unit process to be successively executed under the support of the computer. An operator sets up a known condition as an input of the computer under the support of the computer in the decision subprocess, and operates to run the computer program, so as to execute all of the routine subprocesses under the support of the computer in accordance with the created computer program to complete the process. The program may be configured to allow the series of subprocesses to be successively executed, or to allow each of the subprocesses to be individually executed according to operator's operations.

The above minutely divided minimum unit subprocesses may include office work such as making copies or transporting documents from one department to another department. If any holding period having no job exists between one minimum unit subprocess and another minimum unit subprocess, such a holding period is also checked. That is, it is also encompassed within the scope of the present invention to extract useless jobs and construct the computer program so as to cut or reduce the useless jobs. In present invention, the minimum unit subprocesses are classified into either routine subprocess executable without any decision-making or decision subprocess requiring some decision-making. Then each of the routine subprocesses is checked whether it is essential to execute the process, and the subprocess determined unnecessary is eliminated from the process. For the decision subprocesses, a condition required for each of the decision subprocesses is represented by an unknown variable value or parameter, and the respective results of the different variable values are expressed by a map or a table in the form of digital data. Then, a job flow is constructed to allow the digital data to be automatically read from the map or the like in response to an input of a prerequisite, so as to execute a decision job in the decision subprocess. Thus, the decision process, which would otherwise require the decision-making of a skilled person in the conventional process, can be more readily executed.

Further, a plurality of subprocesses executable in accordance with common input data are detected from the minutely divided minimum unit subprocesses, and a parallel-type job flow is constructed to allow the respective jobs of the detected subprocesses to be simultaneously initiated and executed in parallel. Then, the decision subprocess and the routine subprocess associated therewith are combined to form one unit process, and the aforementioned job flow is incorporated therein to organize the sequence of jobs in each of the unit processes. In this case, a job-support program is created to allow all of the subprocesses to be successively executed under the support of the computer. According to this job-support program, all of the unit processes can be successively executed without useless holding period, by entering an initial condition of the decision job.

The above technical concept of the present invention can be summarized as follows.

The first aspect of the present invention is a method of executing a process using the following steps. (a) A process is divided minutely into a plurality of unit subprocesses. These unit subprocesses consist of one or more decision subprocesses and one or more routine subprocesses. A decision subprocess requires setting up an unknown condition in the execution of each of jobs thereof. A routine subprocess is executable according to a predetermined procedure and does not require any decision-making. The information on those unit subprocesses is stored into a storage section of a computer in the form of computer-readable data. (b) Any subprocess which is executable using the setup condition on specific one of the decision subprocesses is classified as the routine subprocess of that specific decision subprocess. The classified routine subprocess follows after the specific decision subprocess. The information on the classified subprocesses is stored into the storing section of the computer in the form of computer-readable data. (c) One or a series of the decision subprocesses is combined with one or a series of the routine subprocesses which is executable upon the completion of those decision subprocesses to form one unit process, using the data produced in the steps (a) and (b). A job-support computer program is created to allow the plurality of subprocesses included in one unit process to be successively executed under the support of the computer. The computer program is stored into the storing section of the computer. (d) For the decision subprocesses, the unknown condition is set up as an input data of the computer. Computer program is executed, whereby all of the routine subprocesses included in the one unit process are successively executed under the support of the computer to complete the process. In this case, when the job-support computer program is created in the above step (c), the unit subprocesses executable in parallel may be specified among the plurality of subprocesses consisting of the decision and routine subprocesses. In addition, the job-support computer program may be configured to organize the job sequence between the unit subprocesses to allow the jobs in the specified unit subprocesses to be executed in parallel, so that all of the unit subprocesses can be successively executed.

The present invention is also intended to allow the subprocess, which are otherwise classified into the decision subprocess, to be handled as the routine subprocess requiring no decision-making. As a result the number of the decision subprocesses is reduced. In one specific embodiment of the present invention, a single standardized condition is preset as a condition for decision-making and the job-support computer program is configured to display on the computer whether the standardized condition is satisfied. In this way the subprocess otherwise being classified into the decision subprocess can be handled as the routine subprocess and the number of the decision subprocesses is reduced. In another specific embodiment of the present invention, one of the plurality of options which could otherwise be prepared as a standardized condition is preset as the condition for decision-making in at least one of the decision subprocesses, which enables the subprocess otherwise being classified into the decision subprocess to be handled as the routine subprocess and reduce the number of the decision processes. Further, in the present invention, input information required for initiating each subprocess and output information to be created after the completion of each subprocess may be specified. A job flow is constructed such that one subprocess using the output information of the specific subprocess as the input information successively follows after that specific subprocess.

The second aspect of the present invention is a method of executing a process using the following steps. (a) A process is divided minutely into a plurality of unit subprocesses. These unit subprocesses consist of one or more decision subprocesses and one or more routine subprocesses. A decision subprocess requires setting up an unknown condition in the execution of each of jobs thereof. A routine subprocess is executable according to a predetermined procedure and does not require any decision-making. The information on those unit subprocesses is stored into a storage section of a computer in the form of computer-readable data. (a) A known process is divided minutely into a plurality of minimum unit subprocesses. The plurality of those minimum unit subprocesses is classified into a decision subprocess and a routine subprocess. A decision subprocess requires a decision-making for executing a job therein. A routine subprocess is executable according to a predetermined procedure and does not require any decision-making. Each of the plurality of routine subprocesses included in the known process is verified whether it is essential for executing the entire process. Only the routine subprocesses verified as essential is selected and stored into a storage section of a computer in the form of computer-readable digital data. (b) A plurality of standard jobs is defined for a decision job in each of the decision subprocesses. Each standard job has a plurality of parametric conditional values for its initial condition. The information on the plurality of parametric conditional values and corresponding standardized jobs is stored into the storing section of the computer in the form of digital data. (c) A job flow is constructed to allow the decision job in each of the decision subprocesses to be executed under the support of the computer by setting up the initial condition for the decision job as an input of the computer in accordance with the digital data of the standardized jobs. The job flow is stored into the storing section of the computer in the form of computer-readable data. (d) The minutely divided minimum unit subprocesses is analyzed and the minimum unit subprocesses, which are executable using common input data, are detected. The information on the detected subprocesses is stored into the storing section of the computer in the form of computer-readable digital data. (e) A job flow is constructed to allow the respective jobs in the plurality of subprocesses detected in the step (d), which is executable using common input data, to be simultaneously initiated and executed in parallel under the support of the computer. The job flow is stored into the storing section of the computer in the form of computer-readable digital data. (f) The system reads the data of the job flows constructed in the steps (c) and (e), which include the selected routine subprocesses in the step (a) and the decision subprocesses, from the storage section of the computer. A job sequence is constructed for the unit subprocesses to create a job-support computer program for allowing all of the subprocesses to be successively executed under the support of the computer. The computer program is stored into the storing section of the computer. (g) A user enters the initial condition for the decision job and the system runs the computer according to the program so as to execute all of the unit subprocesses under the support of the compute to complete the process.

The third aspect of the present invention is a method of executing a process using the following steps. (a) A process is divided minutely into a plurality of unit subprocesses. These unit subprocesses consist of one or more decision subprocesses and one or more routine subprocesses. A decision subprocess requires setting up an unknown condition in the execution of each of jobs thereof. A routine subprocess is executable according to a predetermined procedure and does not require any decision-making. The information on those unit subprocesses is stored into a storage section of a computer in the form of computer-readable data. (b) One or a series of the decision subprocesses is combined with one or a series of the routine subprocesses, which are executable on the condition of the completion of corresponding the decision subprocesses, to form one unit process. A job-support computer program is created to allow the decision and routine subprocesses included in the one unit process to be successively executed, so that the plurality of unit processes can be executed in a predetermined sequential order under the support of the compute. The computer program is stored into the storing section of the computer. (d) The system runs the computer according to the program, whereby one of the unit subprocesses is executed under the support of the computer. The unit subprocesses following on the executed unit process are executed under the support of the computer according to the program in the same way to complete the process.

The present invention also provides a computer program for executing the above method. The fourth aspect of the present invention is a job-support computer program using the following data. (a) Computer-readable data representing a process which is minutely divided into a plurality of unit subprocesses consisting of one or more decision subprocesses and one or more routine subprocesses. A decision subprocess requires an unknown condition in the execution of each of jobs thereof. A routine subprocesses is executable according to a predetermined procedure and does not require any decision-making. (b) Computer-readable data representing any subprocess, which is executable using the setup condition in specific one of the decision subprocesses, classified into the routine subprocess. The classified routine subprocess follows on the specific decision subprocess. Using the data in a) and b), one or a series of the decision subprocesses are combined with one or a series of the routine subprocesses, which are executable on the condition of the completion of corresponding decision subprocesses, to form one unit process. The plurality of subprocesses included in the one unit process is successively executed.

The fifth aspect of the present invention is a job-support computer program using the following data. (a) Computer-readable digital data representing a known process which is minutely divided into a plurality of minimum unit subprocesses consisting of one or more decision subprocesses and one or more routine subprocesses. A decision subprocess requires an unknown condition in the execution of each of jobs thereof. A routine subprocesses is executable according to a predetermined procedure and does not require any decision-making. (b) Computer-readable digital data representing a plurality of parametric conditional values for an initial condition for a decision job in each of the decision subprocesses. A plurality of standard jobs corresponds to the plurality of conditional values. (c) Computer-readable digital data representing a job flow constructed to allow the decision job in each of the decision subprocesses to be executed by setting up the initial condition for the decision job in accordance with the digital data of the standard jobs. (d) Computer-readable digital data representing the minimum unit subprocesses which are executable in accordance with common input data. Such minimum unit subprocesses are detected through the analysis of the plurality of minutely divided minimum unit subprocesses. (e) Computer-readable digital data representing a job flow constructed to allow the respective jobs in the plurality of subprocesses executable in accordance with common input data to be simultaneously initiated and executed in parallel. Using the data of (a), (b), (c), (d) and (e), a job sequence for the unit subprocesses is constructed to allow all of the subprocesses to be successively executed.

The sixth aspect of the present invention is a job-support computer program using the following data. (a) Computer-readable data representing a process which is minutely divided into a plurality of minimum unit subprocesses consisting of one or more decision subprocesses and one or more routine subprocesses. A decision subprocess requires an unknown condition in the execution of each of jobs thereof. A routine subprocesses is executable according to a predetermined procedure and does not require any decision-making. One or a series of the decision subprocesses are combined with one or a series of the routine subprocesses which are executable on the condition of the completion of corresponding the decision subprocesses to form one unit process. The decision and routine subprocesses included in the one unit process are successively executed. The plurality of unit processes can be executed in a predetermined sequential order.

The above job-support computer program may be configured to provide a window for prompting a user to enter a condition required for executing the decision subprocess, on the screen of the computer.

Further, the present invention provides a method of executing the aforementioned job-support computer program on a computer.

BRIEF DESCRIPTION OF THE DRAWINGS

FIG. 1A is an exemplary flowchart showing a process execution method according to one embodiment of the present invention.

FIG. 1B is a flowchart showing steps following on the steps of FIG. 1A.

FIG. 2 is exemplary diagrams showing maps A, B and C for use in computing in the embodiment of FIG. 1.

FIG. 3 is diagrams showing the method of minutely dividing a conventional process in another embodiment of the present invention, wherein FIG. 3A shows the conventional process, and FIG. 3B shows the minutely divided subprocesses.

FIG. 4 is diagram showing one example of an improved process according to the present invention, wherein FIG. 4A shows a reduced number of subprocesses achieved through standardization and automatization, and FIG. 4B shows a reduced process lead-time achieved by executing some subprocesses in parallel.

FIG. 22 is top plan views showing the type and the location of gates, wherein FIG. 22A shows a side gate, and FIG. 22B shows a direct gate.

FIG. 25B shows the formation of a parting surface at a stepped portion.

FIG. 28A is diagrams showing one example of a standard slider material.

FIG. 29 is a schematic diagram showing a job distribution system in one embodiment of the present invention.

FIG. 30E is an enlarged view of a system interface shown in the flowchart of FIG. 30A.

FIG. 30F is an enlarged view of a system interface shown in the upper position of the flowchart of FIG. 30B.

FIG. 30G is an enlarged view of a system interface shown in the middle position of the flowchart of FIG. 30B.

FIG. 30H is an enlarged view of a system interface shown in the lower position of the flowchart of FIG. 30B.

FIG. 30I is an enlarged view of a system interface shown in the upper position of the flowchart of FIG. 30C.

FIG. 30J is an enlarged view of a system interface shown in the middle position of the flowchart of FIG. 30C.

FIG. 30K is an enlarged view of a system interface shown in the lower position of the flowchart of FIG. 30C.

FIG. 30L is an enlarged view of a system interface shown in the flowchart of FIG. 30D.

DESCRIPTION OF THE PREFERRED EMBODIMENT

Figure 5:
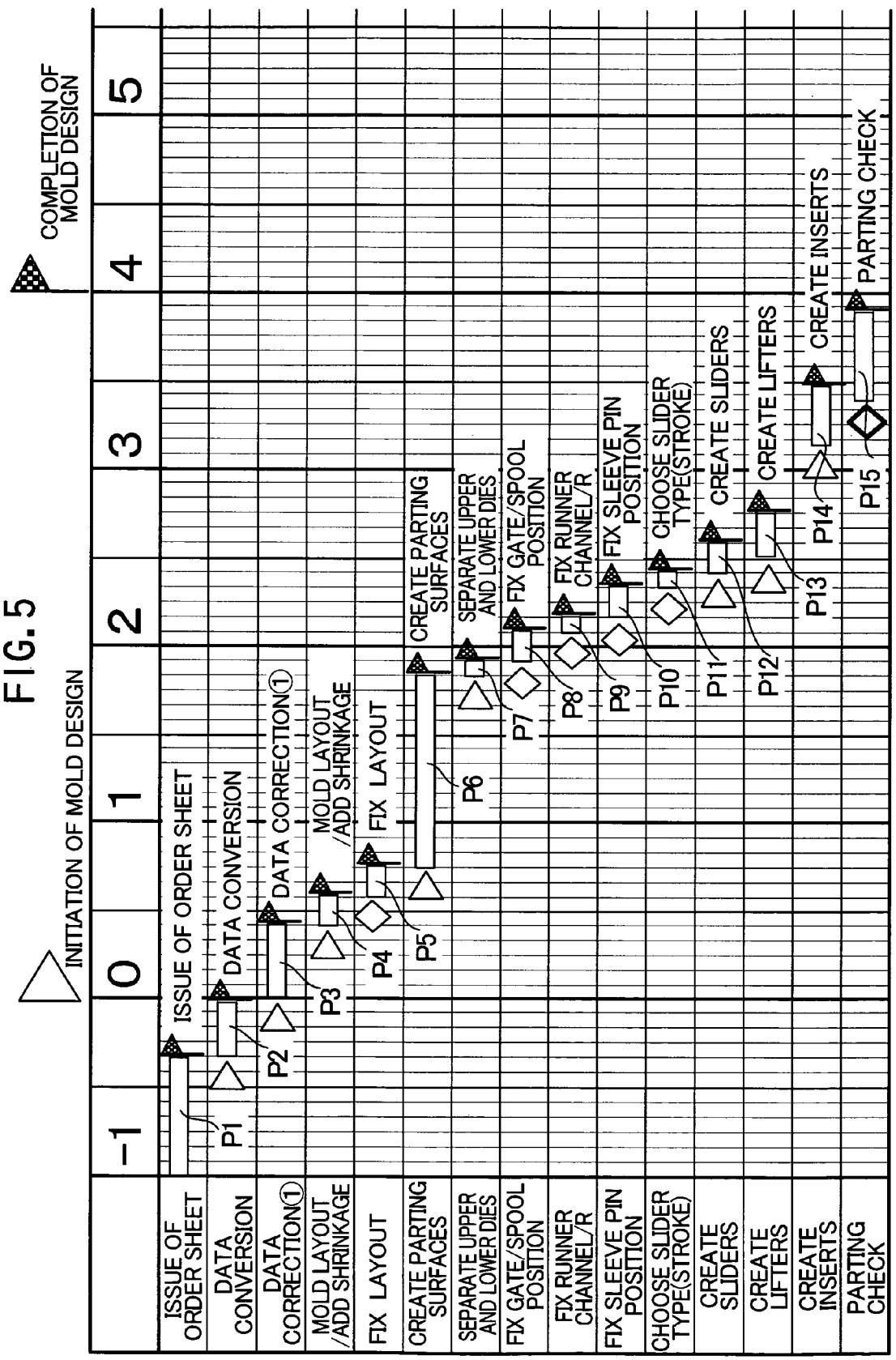
FIG. 5 is a process chart showing a die design process, wherein the process is divided into a plurality subprocesses, and each progress of the subprocesses is illustrated along the time axis.

With reference to the drawings, various embodiments of the present invention will now be described. FIGS. 1A and 1B are flowcharts showing a process for production cost estimation of a stereolithography model. Stereolithography is a technique of molding a 3-dimensional object analogous to an intended product by exposing resin to a light according to the product data. The light is sequentially irradiated on each of layers defined by slicing the 3-dimensional shape of the product along its height direction at given intervals. A vertically movable support plate is provided in a vessel containing resin. A first resin layer located at the level in the vessel is first exposed to the light. After the support plate moves downward by a distance equal to the thickness of one layer, the second resin layer is exposed to the light. Subsequently, the support plate moves downward to expose each of the layers corresponding to the 3-dimensional shape of the product. When the support plate moves downward by the distance equal to the thickness of one layer after the completion of the first exposure, a recoat operation is performed to supply a liquid resin on the support plate at an amount required for forming one resin layer.

A production method for such stereolithography products is disclosed in detail, for example, in Japanese Patent Laid-Open Publication Nos. S56-144478 and H032-46025 and U.S. Pat. No. 4,575,330. Heretofore, in a process of preparing a cost-estimation in response to a production request for a stereolithography model, all of cost-estimation data, such as the amount of resin to be used in the production of the optical modeling product and a man-hour required for the modeling, have been calculated based on predictive values made by an experienced personnel according to related drawings. Such a cost-estimation, however, relies almost exclusively on the experiences and intuitions of the personnel, and the preparation of a written estimate can be seriously delayed due to the absence of a personnel responsible for the cost-estimation.

In one embodiment of the present invention as shown in FIG. 1, a cost-estimation process for production of stereo lithography models can be accurately executed through a simple operation of a computer without relying upon experienced persons as in the conventional process. Data in each of steps of a process as shown in FIGS. 1A and 1B are stored in a storage section of a computer in the form of computer-readable digital data. Process or job flow for executing the process is also stored in the storage section of the computer as a job-support computer program.

In this embodiment, as shown by Step S1 in FIG. 1A, product-design data is first entered into the computer in the form of digital data. The product-design data can be created using appropriate software of a 3-dimensional CAD system.

At Step S2, the volume V, surface area S, projected area P in top plan view and height h of the rapid prototyping model (RP model) are computed by the computer. At Step S3, the number of RP models to be produced is read out. For example, if the modeling product is a container composed of a case body and a cover, the number of models will be calculated as two. The number of models can be read from the product-design digital data.

At Step S4, a data-processing time of the product-design data is calculated in accordance with the number of models which has been read out at Step S3. This calculation is executed using a map A in FIG. 2 which is created according to a standardization concept of the present invention. As seen in the map A of FIG. 2, the data-processing man-hour is standardized. Specifically, it is 2 hours for one or two components, and 1 hour/component for three or more components. The number of components has been entered as input data at Step S1, and the computer executes the calculation in accordance with the input data and the map A. After reading out the data-processing man-hour, the data-processing cost is computed according to the following computing expression in Step 5.

Data-processing cost=basic charge+(data-processing man-hour×labor charge)  Formula(I)

In this expression, the basic charge is a predetermined value independent of the number of components of a modeling product, and the labor charge is a labor charge/hour which is also a predetermined value. In this way, the calculation is standardized in order to determine the data-processing time of product-design data in accordance with the number of components of a modeling product. Thus, any person capable of operating a computer can calculate the data-processing time.

At Step S6, the volume V of the modeling product is read out. Based on the volume V of the modeling product, a material cost of the modeling product is determined through computing at Step S7. This computing is executed according to the following computing expressions II-(1) and II-(2) in a two-step manner.

Material weight ($W$)=volume ($V$)×specific gravity× coefficient $a$  Fromula(II-1)

Material cost=material weight ($W$)×price/unit weight  Formula(II-2)

This calculation is also standardized in order to determine the material cost using the predetermined expressions in accordance with the volume V of the modeling product calculated from the product-design digital data. Thus, any person capable of operating a computer can execute this calculation.

The process then skips to FIG. 1B, where the projected area P from the top view of the modeling product is read out at Step S8. The projected area P is obtained from the product-design data which has been entered at Step S1. Then, a designated specification of the modeling product is read out at Step S9. The designated specification relates to customer's designations concerning the finishing level of the optical modeling product, and is entered into the computer in advance as a designated condition at Step S1. Then, a recoat time $t_1$/layer associated with exposure is determined through computing at Step S1. The recoat operation in the production of stereo lithography models can be understood in reference to the aforementioned patent publications.

A map B as shown in FIG. 2 is prepared to compute the recoat time. The recoat time/layer is determined in accordance with the projected area which has been obtained at Step S8. In the map B, the column represented as "trap" and "quick cast" relates to the designated specification which has been read at Step S9, and is one of the initial conditions based on customer's designations. The recoat time $t_1$/layer consists of a basic part and an area-associated part. The area-associated part is read from the map B, and added to the basic time depending on the designated specification. Then, an exposure time/layer or laser irradiation time $t_2$/layer is computed at Step S11. This laser irradiation time $t_2$ is also computed using the map B. The computing at these Steps S10 and S11 can be executed in accordance with the same data, or the projected area V and the designated specification. Thus, these Steps S10 and S11 may be concurrently executed. While the advantage of concurrently executing the Steps S10 and S11 is small in this embodiment because both Steps can be executed without taking a particularly long time, a process time can be reduced drastically in some cases.

Then, at Step S12, the height h of the modeling product is read out. Based on the height h of the modeling product at Step S12, the number n of layers is computed at Step S13. The following computing expression III is used in this computing.

$n=(h+H)/b$  Formula(III)

In this expression, H is the thickness of a support portion to be formed in the bottom of the modeling product. Generally, in the production of stereo lithography models, the support portion is designed to have a thickness of about 10 mm. In the above expression, b is the thickness of one layer. Then, at Step S14, a modeling time T is computed. This computing is executed using the following computing expression IV.

$T=(t_1+t_2)n$  Formula(IV)

The process proceeds to Step S15 to compute an optical modeling cost. This computing is executed using the following computing expression V.

Optical modeling cost=modeling time $T$×unit cost/ hour  Formula(V)

Then, the process proceeds to Step S16 to calculate a man-hour $t_3$ of a finishing subprocess. This computing is executed according to the following computing expression VI.

$t_3$=finishing man-hour+2 hours  Formula(VI)

The breakdown of the finishing man-hour calculation is shown as follows.
Finishing Man-Hour
1. Cleaning 30 minutes
2. Removal of Support n×10 minutes×0.5 (in case of 10 to 200 square)
   n×10 minutes×1.5 (in case of 200 or more square)
3. Post-Cure 60 minutes (in case of 10 to 200 square)
   90 minutes (in case of 200 or more square)
4. Surface Finishing surface area×finishing level (Polishing)

The finishing is divided into 5-levels A, B, C, D and E. According to a finishing level table as shown by a map C in FIG. 2, the finishing man-hour is determined depending on the surface area to be finished.

The results obtained from the above calculation steps can be put together to provide the production cost estimation of the optical modeling product. According to this embodiment of the present invention, an estimation job, which heretofore has relied on the experiences and intuitions of a skilled person, can be standardized, and more quickly executed than ever before. In particular, the subprocess requiring decision-making is standardized to allow the estimate to be prepared without relying on any skilled person.

FIG. 3 shows another embodiment of the present invention. FIG. 3A is a diagram simply showing a conventional method of executing a process consisting of a series of jobs: a job A executed by a worker, a job B executed by a machine, a job C executed by a worker and a job D executed by a machine. FIG. 3B is a diagram, corresponding to FIG. 3A, showing the result of minutely subdividing each of the jobs in the process of FIG. 3A into a plurality of minimum unit subprocess according to the concept of the present invention. The minutely divided units are classified into a routine subprocess executable without any decision-making, and a decision subprocess requiring decision-making for executing a job therein. For example, a job such that a clerical assistant sends a received document to a predetermined user belongs to the routine process.

An example of the process shown in FIG. 3 includes an injection molding process for producing a plastic product using a die assembly. In such a production process, a die design is first executed. The job A corresponds to the die design process in this case. The job A starts with receiving a job instruction, and product data such as product drawings or product instructions. The job instruction and these product data are given to a die-design planner (subprocess a) through a clerical person. The die-design planner prepares a die design plan (subprocess b). Then, the die design plan is delivered to a die design engineer (subprocess c), and the die design is executed by the die design engineer (subprocess d). For approval, a prepared die design is delivered to an immediate supervisor of the die design engineer through a clerical person (subprocess e). If the immediate supervisor is out of his/her office or is pressed by another job, a certain holding period (g) is generated before the approval (subprocess f). After the approval of the immediate supervisor of the die design engineer, the die design is delivers to an upper supervisor to obtain his/her approval (subprocess h). In this subprocess, it is highly possible that another holding period (j) is also generated before the approval (subprocess i).

The job B corresponds to a die production process. This job includes a subprocess of obtaining a material or preparing a machining center, a subprocess of setting the material to the machining center, a subprocess of processing/polishing a die and others. Since the arrangement of the material is generally initiated after receiving the die design data, a temporal blank is generated between the completion of the job A and the initiation of the job B. In addition, the timing of finalizing the die assembly will be delayed due to the above procedure of initiating the arrangement of the material after receiving the die design data.

In the jobs C and D, a plastic product is injection-molded using the die assembly created in process B. The job C includes various preliminary jobs to be manually executed. The job D is a molding job to be executed using an injection molding apparatus. These jobs also include a certain holding period (k), and actually include some useless jobs.

FIG. 4 shows an improved process according to the present invention. In this process, all data for design and production are stored in a storage section of a central processing unit 10 in the form of computer-readable digital data, and effectively utilized in each of subprocesses. The data stored in the storage section of the central processing unit 10 can be accessed from any one of terminal devices 11 connected with the central processing unit 10.

FIG. 4A shows a process in which the number of subprocesses thereof is reduced as the result of standardization and automatization. In die design, product-design data is prepared by a 3-dimensional CAD in the form of digital data, and the die design is executed using this product design data. Components used in a die assembly, such as sliders or inserts, are standardized to allow predetermined components to be selected in accordance with the dimensions and shape of an intended product. This technique is described in detail in Japanese Patent Application No. 2000-396690, and the technical content described in this patent application may be applied directly to the present invention. If the technique of the die design using the 3-dimensional digital data is applied to the present invention, the supervisor's approval as in the job B of FIG. 3A is seldom or never required. In a die production process, without relying on an electric discharge machining process, a highly accurate processing has been realized according to a technique developed by the applicant, as described in the above patent application, and thus the number of subprocesses in the job B can be reduced.

FIG. 4A shows that the entire process time is further shortened according to the present invention. For example, between the jobs A and B, the arrangement of the material required in the job B can be executed before the completion of the job B. Further, as shown by m, n and o in FIG. 4B, the design of sliders or inserts can be executed in parallel with the job A even before the completion of the job A. Between the jobs B and C, a part of subprocesses in the job C can be initiated before the completion of the job B, as shown by p and q in FIG. 4B. In the same manner, between the jobs C and D, a part of subprocesses in the job D can be initiated before the completion of the job C, as shown by r, s and t in FIG. 4B.

In order to allow the subprocesses r, s and t in the job D to be initiated before the completion of all subprocesses included in the job C, in this embodiment of the present invention, input information required for initiating the job and output information to be created after the completion of the job are specified to construct a job flow such that one subprocess included in the job D, e.g, the subprocess r, s, t, requiring the output information from another subprocesses included in the job C, e.g. the subprocess q, as the input information for initiating the job in the subprocess r, s, t can be initiated any time after the completion of the subprocess q. The job flow is stored in the storage section of the computer in the form of computer-readable digital data.

This point will be described in more detail later in connection with another embodiment.

As mentioned above in detail, according to the present invention, based on intensive analysis of a conventional process execution method, the subprocesses constituting a process can be reconstructed to allow the subprocesses to be fully automatically executed in their entireties. Further, based on intensive standardization, the present invention can provide a process execution method capable of thoroughly eliminating the need for decision-making of skilled persons. Furthermore, according to the present invention, any useless subprocess in the conventional process execution method can be intensively eliminated to provide a drastically reduced process time.

FIG. 5 is a process chart showing a design stage of a die assembly for use in injection-molding a plastic product. This process chart can be regarded as the process in FIG. 4B applied to an actual die design process. The horizontal axis of the process chart represents a lapsed time (5 minutes/scale mark) expended by jobs The process chart in FIG. 5 includes unique marks attached to respective subprocesses divided into P1 to P15. More specifically, when a prerequisite is satisfied, the job in a routine subprocess requiring no decision-making can be executed regardless of the level of skill by following a predetermined procedure. For this type of subprocess, a triangle "GO" symbol is attached at a time point of initiating the subprocess, and a crossbar having a length corresponding to a standard subprocess time is described after the triangle. A flag mark indicating the completion of the subprocess is also attached at a position where the standard subprocess time lapses or the job in the subprocess is completed. In this subprocess, a computer program is constructed such that the job in the subprocess can be initiated by clicking an execution button on a computer screen after a condition of initiating the subprocess is satisfied, and subsequently the job can be executed by performing given operations according to instructions appearing on the computer screen.

In FIG. 5, for a decision subprocess requiring decision-making, a diamond mark indicating the decision subprocess is attached at a position where the subprocess is initiated. This decision subprocess includes a job of making a decision on all factors from beginning in accordance with experiences or knowledge, or a job of selecting optimal one from several options in accordance with experiences or knowledge. This job is executed through a user's operation on the computer screen of one of the terminal devices. A final decision subprocesses is a final check subprocess for deciding whether the process should be advanced to the next process, and required to make a most important decision. Thus, a thickly outlined diamond mark is attached to this subprocess. This job is also executed through a user's operation on the computer screen of one of the terminal devices.

In this process chart, the subprocesses represented with the different marks depending on the classifications of job makes it easy to distinguish between the routine and decision subprocesses. In addition, the ratio of the decision subprocesses to the entire process can be recognized at a glance, and used as a guideline for further improving the process.

In the die design process shown in FIG. 5, the subprocesses P1 to P4 are in a simple preliminary stage, and required to make no decision. The subsequent "Fix Layout" subprocess P5 and other subprocesses include authentic design jobs. The "Fix Layout" subprocess P5 which requires decision includes a job of determining the position of the product data in a die block, and a parting line PL or parting surface. A routine process, "Create Parting Surfaces" subprocess P6 and "Separate Upper and Lower Dies" subprocess P7 follow on the subprocess P5. These subprocesses P6 and P7 can be executed as a simple job successively after the completion of the "Fix Layout" subprocess P5 which is a decision subprocess. In the present invention, the decision subprocess and the routine process executable in response to or on the condition of the completion of the decision process are defined as one unit process. That is, (one or a series of decision processes)+(one or a series of routine processes)=one unit process The data for the unit processes are stored in the storage section of the computer in the form of computer-readable digital data.

In the above description, all of the information data related to subprocesses are stored in the storage section of the central processing unit 10 of the computer in the form of computer-readable digital data, and a job-support program for executing the subprocesses under the support of the computer is constructed and stored in the storage section of the central processing unit 10.

Figure 6:
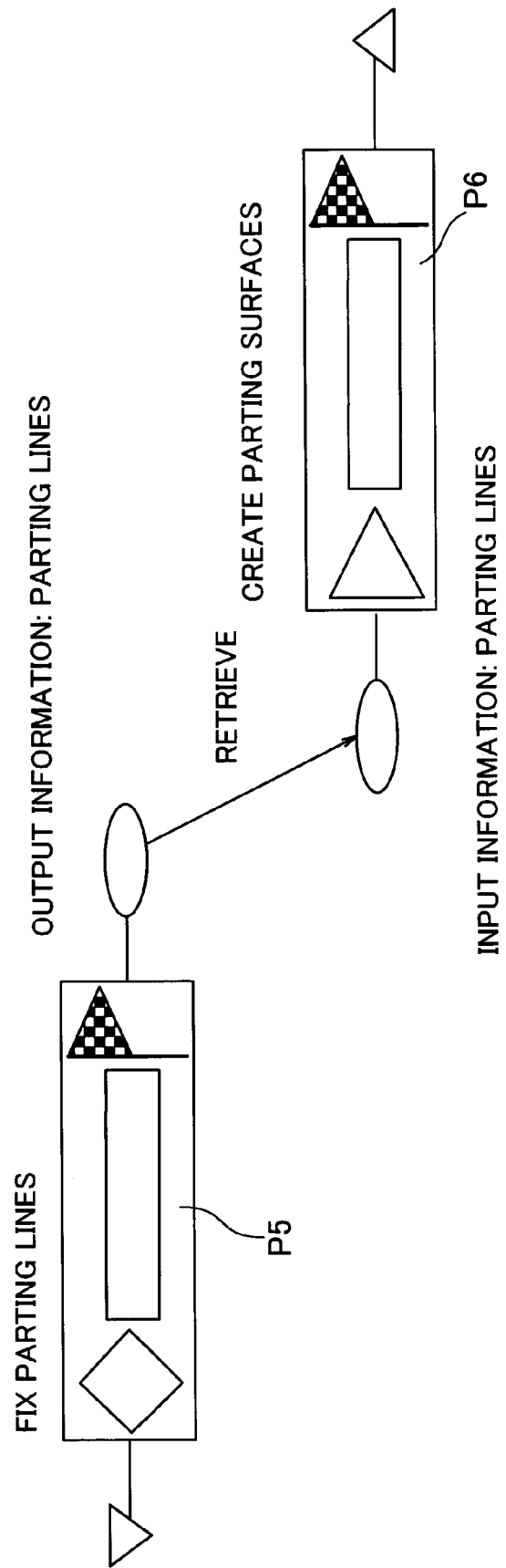
FIG. 6 is a diagram showing the link between subprocesses.

FIG. 6 shows the linkage between the subprocesses P5 and P6 constituting one unit process. A certain rule is necessary to link these subprocesses with one another. Upon completing the subprocess P5, data of parting line PL is generated as output information. The computer will retrieve subprocess requiring this output information as its input information, which in this case is "Create Parting Surfaces" subprocess P6. In this way, the "Fix Layout" subprocess P5 is liked to the "Create Parting Surfaces" subprocess P6 using the output information parting line generated upon the completion of the "Fix Layout" subprocess P5.

The "Separate Upper and Lower Die" subprocess P7 is executed by using output information from the "Create Parting Surfaces" subprocess P6 as input information. Upon completing in subprocess P7, die separation data representing that the upper/lower dies are separated from one another is generated as output information. Then, based on this output information, an upper-die design process A and a lower die design process B are registered in the computer as individual processes, and the processes A and B will be executed in parallel separately.

In FIG. 5, the subprocess P8 and subsequent subprocesses are provided to execute jobs for designing one of the upper or lower dies, and the corresponding jobs for the other die are executed in the same manner.

The decision subprocesses comprising a "Fix Gate/Spool Position" subprocess P8, a "Fix Runner Channel/Curvature-radius" subprocess P9, a "Fix Seeve Pin Position" subprocess P10 and a "Choose Slider Type (Stroke)" subprocess P11 follows on the subprocess P7. Given that these decision subprocesses are defined as the aforementioned one or a series of the decision subprocesses, a series of routine subprocesses consisting of a "Create Sliders" subprocess P12, a "Create Lifters" subprocess P13 and a "Create Inserts" subprocess P14 will follow on the above one or a series of decision subprocesses in conjunction therewith. The combination of these subprocesses P8, P9, P10, P11, P12, P13 and P14 can be regarded as one unit process.

Before describing the present invention in more detail with reference to FIG. 5, a conventional die design/production process will be described in connection with a die assembly for use in molding an outer case of a cell phone, for developing a better understanding.

Figure 7:
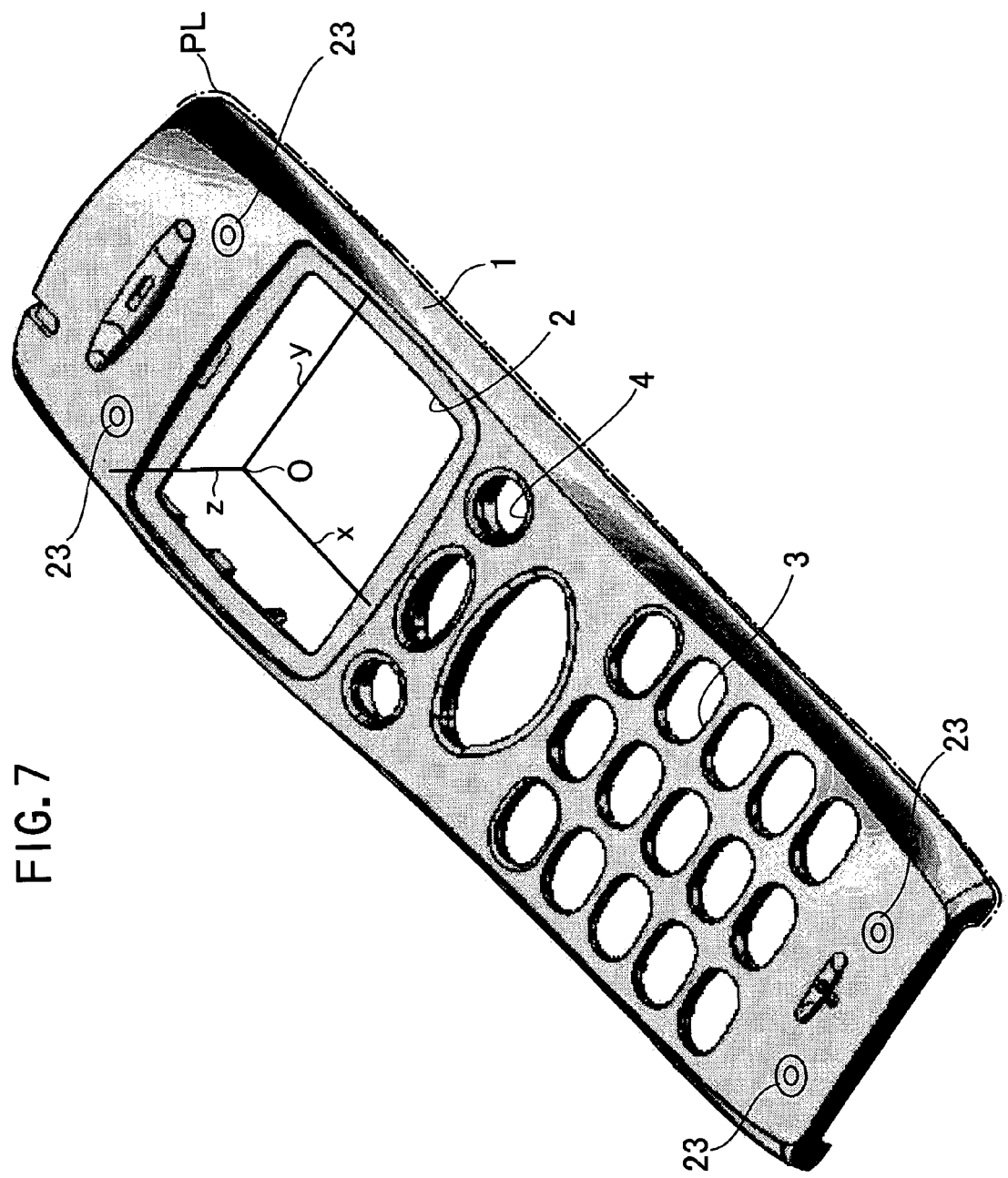
FIG. 7 is a perspective view of a front case of a cell phone as one example of a product to be molded with a die assembly produced by applying the present invention.

FIG. 7 is a perspective view showing a shape of a front case 1 of a cell phone. A case of the cell phone comprises the front case 1 as shown in FIG. 7, and a rear case (not shown) to be fitted to the front case 1. Design digital data representing the shapes of the front case 1 and the rear case are created by a 3-dimensional CAD. A currently widely used 3-dimensional CAD includes CATIA, UG, Pro/E and I-DEAS, all of which can be used in designing the case of the cell phone. As shown in FIG. 7, the front case 1 includes a window hole 2 for attaching a liquid-crystal display screen therethrough, a hole 3 for fitting number keys, buttons, and a hole 4 for another operational button, on the side of the front surface thereof. While not clearly shown in FIG. 7, an opening is formed in the sidewall of the front case 1 in its lateral direction. A number of protrusions and ribs are formed on the rear surface of the front case to create several undercut portions which will interfere in releasing the injection-molded front case 1 from the dies.

The 3-dimensional shape of the front case 1 as shown in FIG. 7 can be displayed on the computer screen in accordance with the design digital data.

In a die design process, the first subprocess comprises fixing the parting surface between upper and lower dies. The parting surfaces are typically set along a line connecting points which protrude most outward in the external profile of a product.

The position of the parting surfaces can be defined as coordinates by arranging the x-axis, y-axis and z-axis in the longitudinal, lateral and vertical directions of the product, respectively, and plotting the points which are located on the external surface of the product crossing the parting surface.

The parting surfaces can be displayed with a particular color, such as red, as one alternative of the parting line PL on the surface of the product in a screen image. Only a part of one example of the parting lines is indicated by a two-dot chain line in FIG. 7.

While the parting line PL in FIG. 7 is depicted apart from the product to avoid graphical complication, the actual parting line is located on the surface of the 3-dimensional image representing the product displayed on the computer screen. A computer program for fixing the parting surface may be configured to display not only one but also multiple alternatives of the parting surface.

Figure 8:
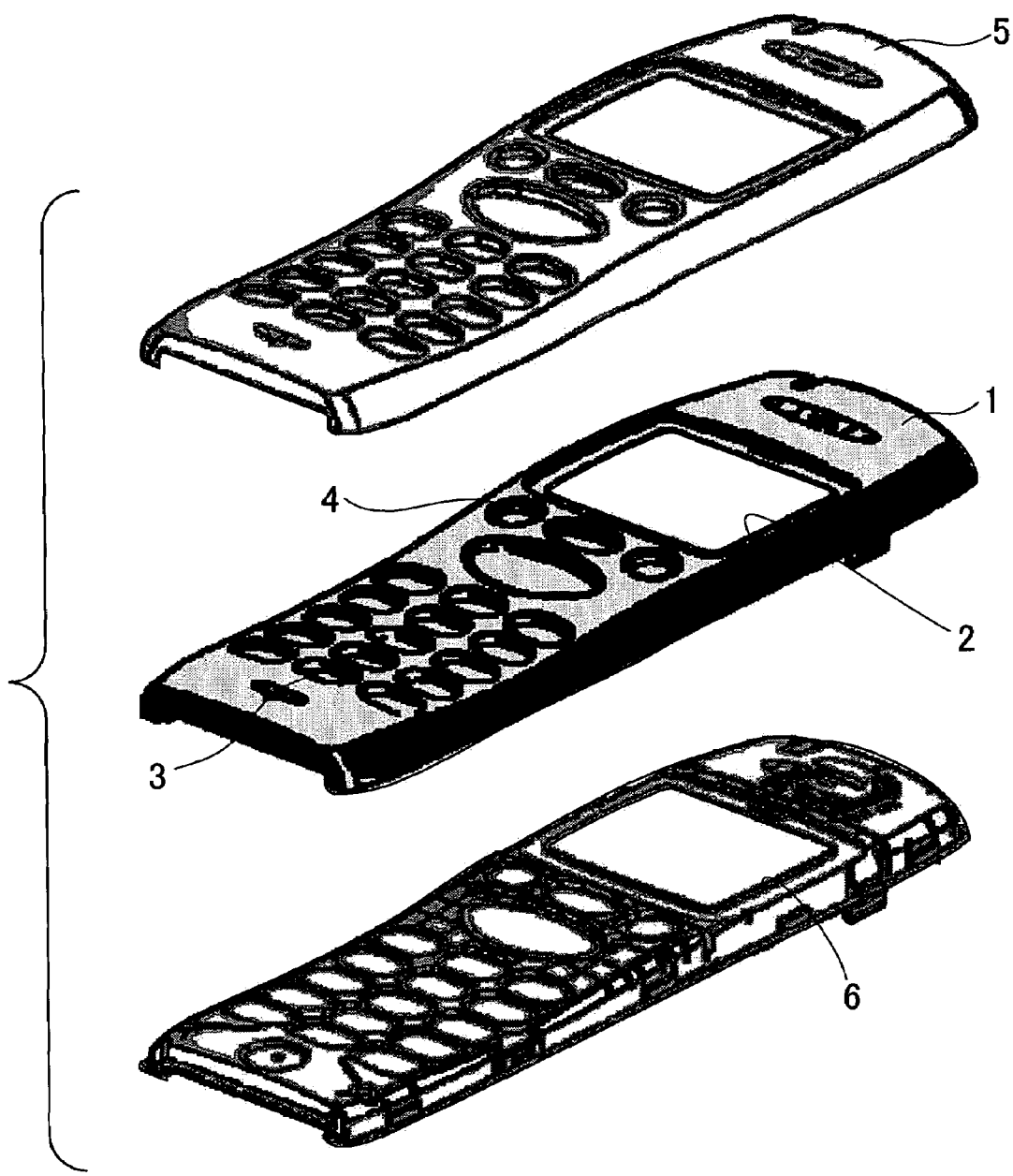
FIG. 8 is a perspective view showing a designing depression and protrusion of upper and lower dies after a die separation subprocess in the die design process.

FIG. 8 is a perspective view showing the respective shapes of molding surfaces to be formed in upper and lower dies after the parting line is fixed. In FIG. 8, the front case 1 as a product is shown at the center thereof, a depression 5 defining the molding surface of the upper die being shown above the front case 1, and a protrusion 6 defining the molding surface of the lower die being shown below the front case 1. When the upper and lower dies are closed, the depression 5 of the upper die and the protrusion 6 of the lower die will define a molding cavity therebetween.

Figure 9:
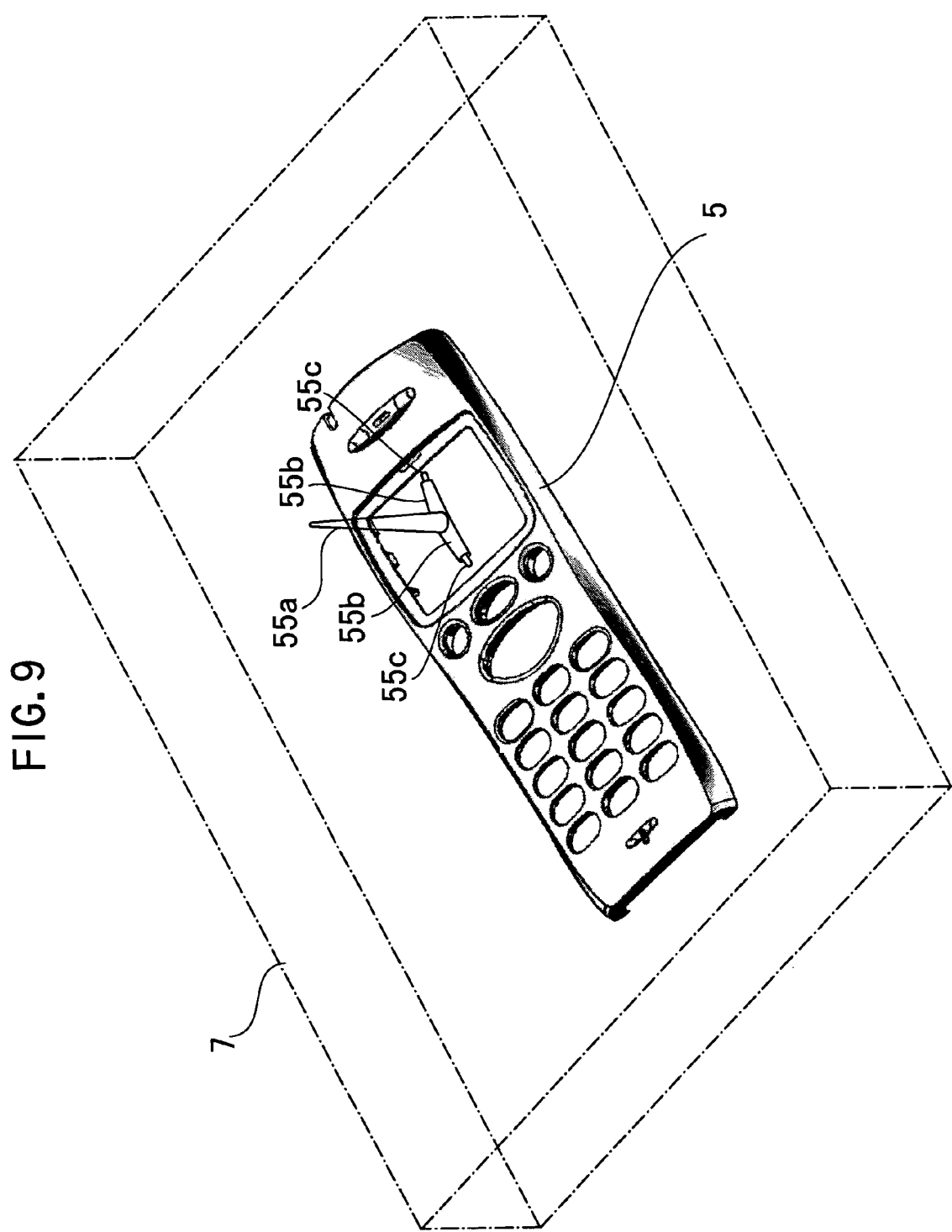
FIG. 9 is a perspective view showing an upper die block in its fixing subprocess.
Figure 10:
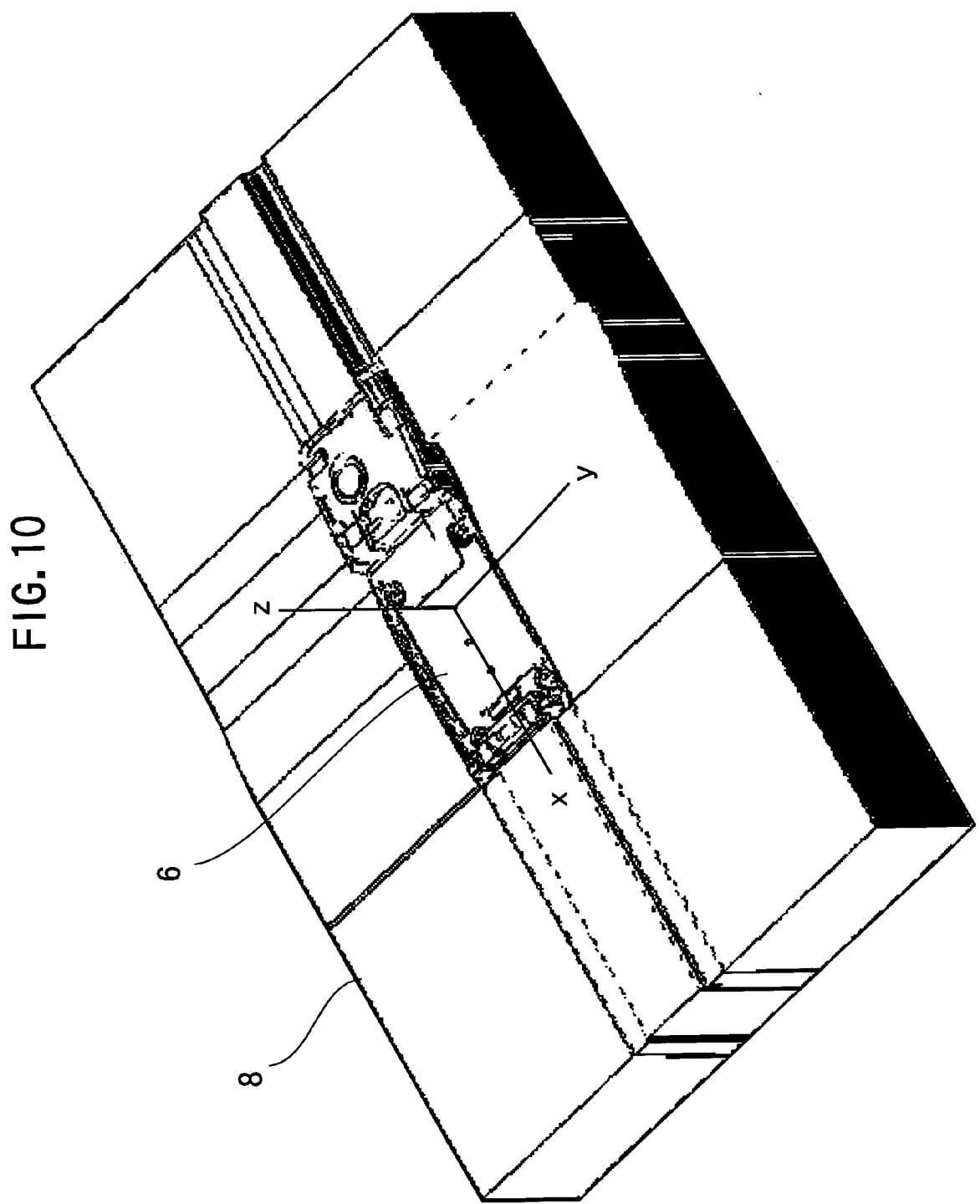
FIG. 10 is a perspective view showing a lower die block in its fixing subprocess.
Figure 11:
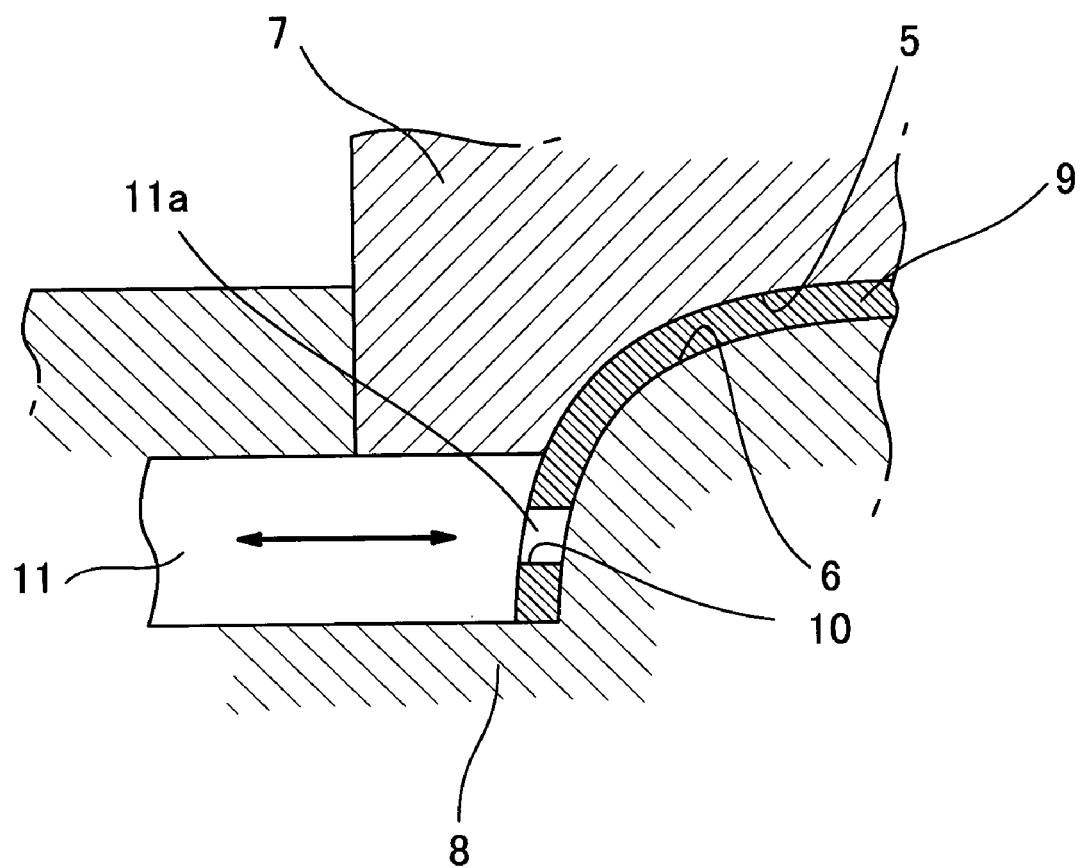
FIG. 11 is a schematic sectional view showing a slider.

FIG. 9 shows the depression 5 with an upper die block 7 superimposed thereon. FIG. 10 shows the protrusion 6 with a lower die block 8 superimposed thereon. If a portion of the front case, such as a hole formed in the sidewall thereof, has a shape interfering in releasing the molded front case from the dies, it is required to arrange a slider at a position of such a portion. FIG. 11 shows a concept of the slider. In FIG. 11, a molding cavity 9 is defined between the depression 5 of the upper die block 7 and the protrusion 6 of the lower die block 8, and a molten plastic injected into the molding cavity 9 is cooled and solidified to form a product. If it is necessary to form a hole 10 in the sidewall of the product, a slider 11 will be arranged in such a manner that it slides in a direction of an arrow in FIG. 11. The front end of the slider 11 is a core 11a forming the hole, which protrudes into the molding cavity 9. After the product is cooled and solidified, the upper die block 7 slides upward, and the slider 11 moves in a direction getting away from the molding cavity, so as to allow the product to be taken out of the die assembly.

Figure 12:
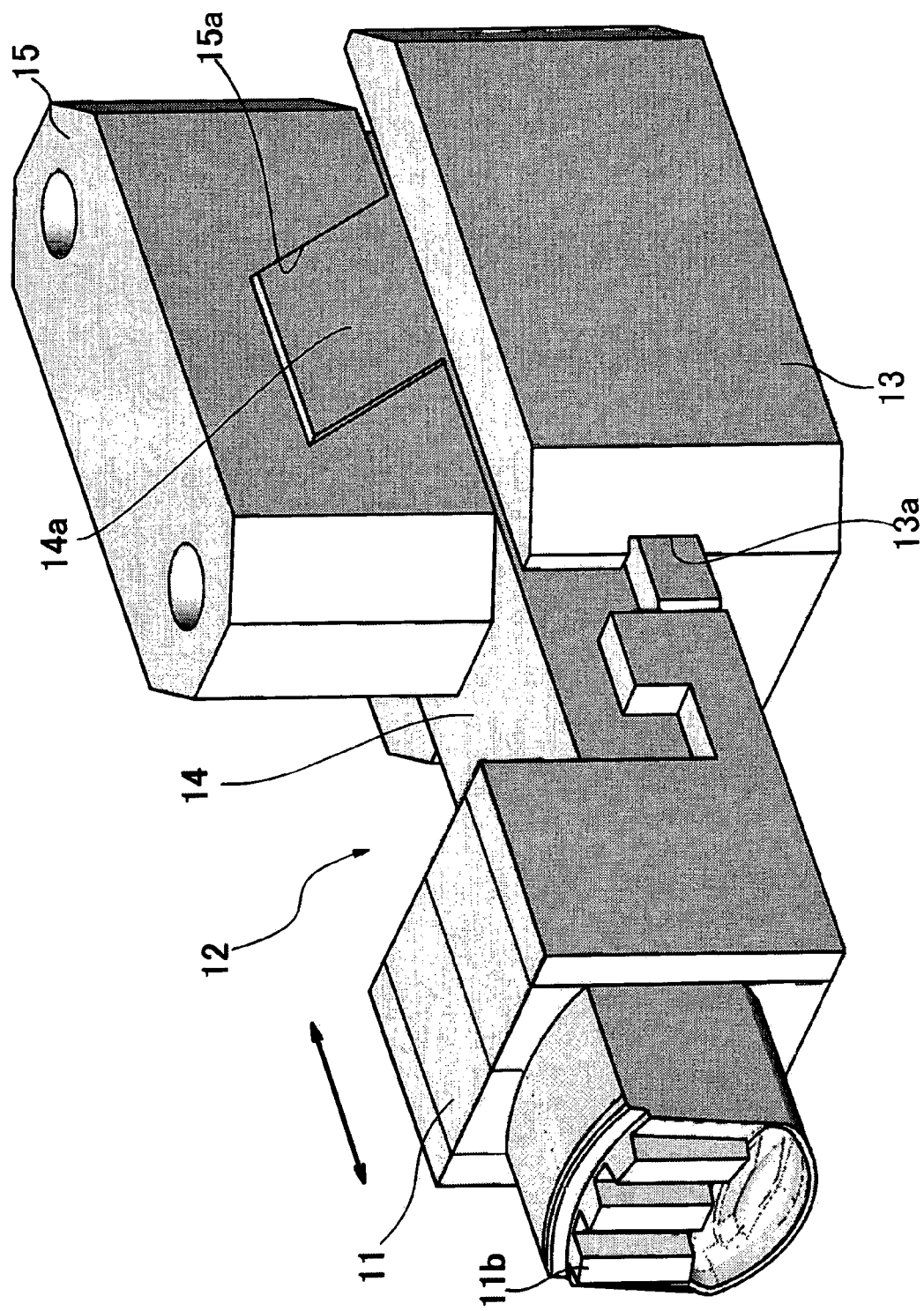
FIG. 12 is a perspective view showing one example of a slider unit.
Figure 13:
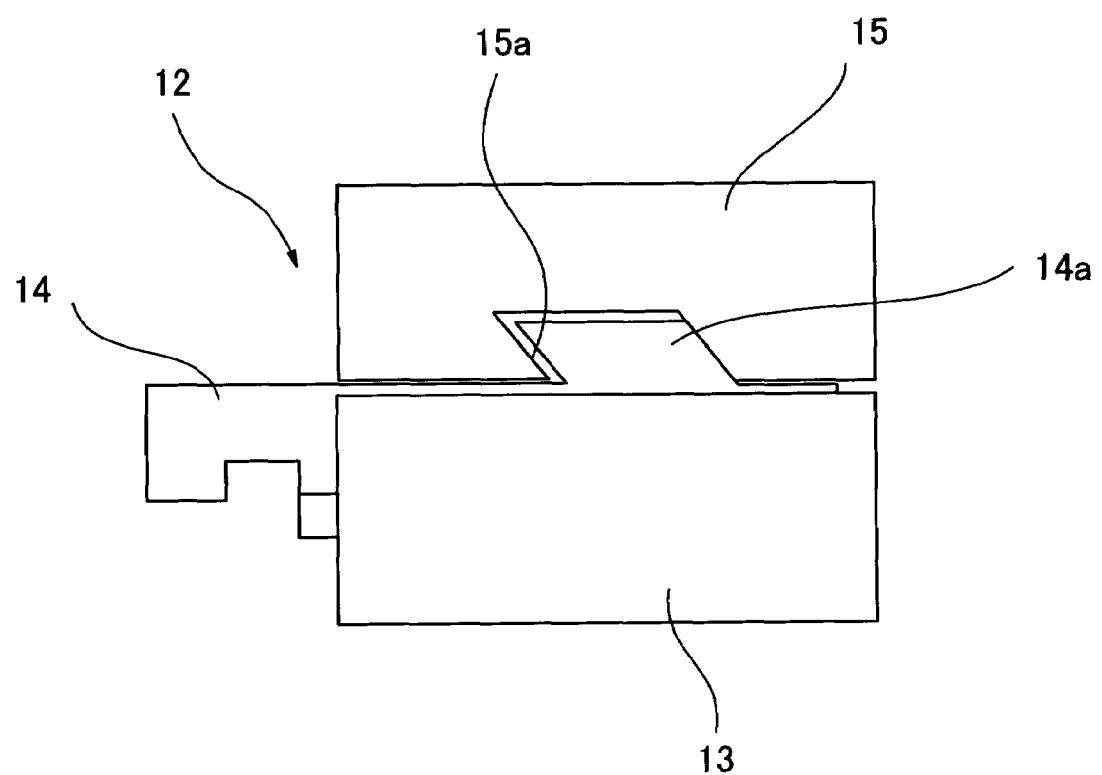
FIG. 13 is a side view of the slider unit.

For example, the slider may be designed as a slider unit 12 as shown in FIGS. 12 and 13. In FIG. 12, the slider unit 12 includes a slider guide 13 to be fixed to the lower die block 8. The slider unit 12 is provided with a movable member 14 which is guided along a guide groove 13a formed in the slider guide 13 and slides in a direction of an arrow in FIG. 12, and the slider 11 is detachably attached at the front end of the movable member 14. The front end of the slider 11 is formed with a forming core 11 having a desired shape. In addition, the slider unit 12 includes a locking block 15 to be fixed to the upper die block 7. As clearly shown in FIG. 13, the locking block 15 has an inclined cam groove 15a having an opening facing downward. The cam groove 15a extends downward to get away from the front end of the slider 11. The upper surface of the movable member 14 is formed with an inclined cam-follower member 14a to be engaged with the cam groove 15a of the locking block 15.

Thus, in a position where the upper die block 7 is matched with the lower die block 8, the movable member 14 and the slider 11 are pushed toward the molding cavity 9 to allow the forming core 11a at the front end of the slider 11 to be inserted into a desired position in the molding cavity 9. When the upper die block 7 is moved upward, the movable member 14 and the slider 11 move in the direction getting away from the molding cavity to allow the forming core 11a to get out of the molding cavity.

Figure 14:
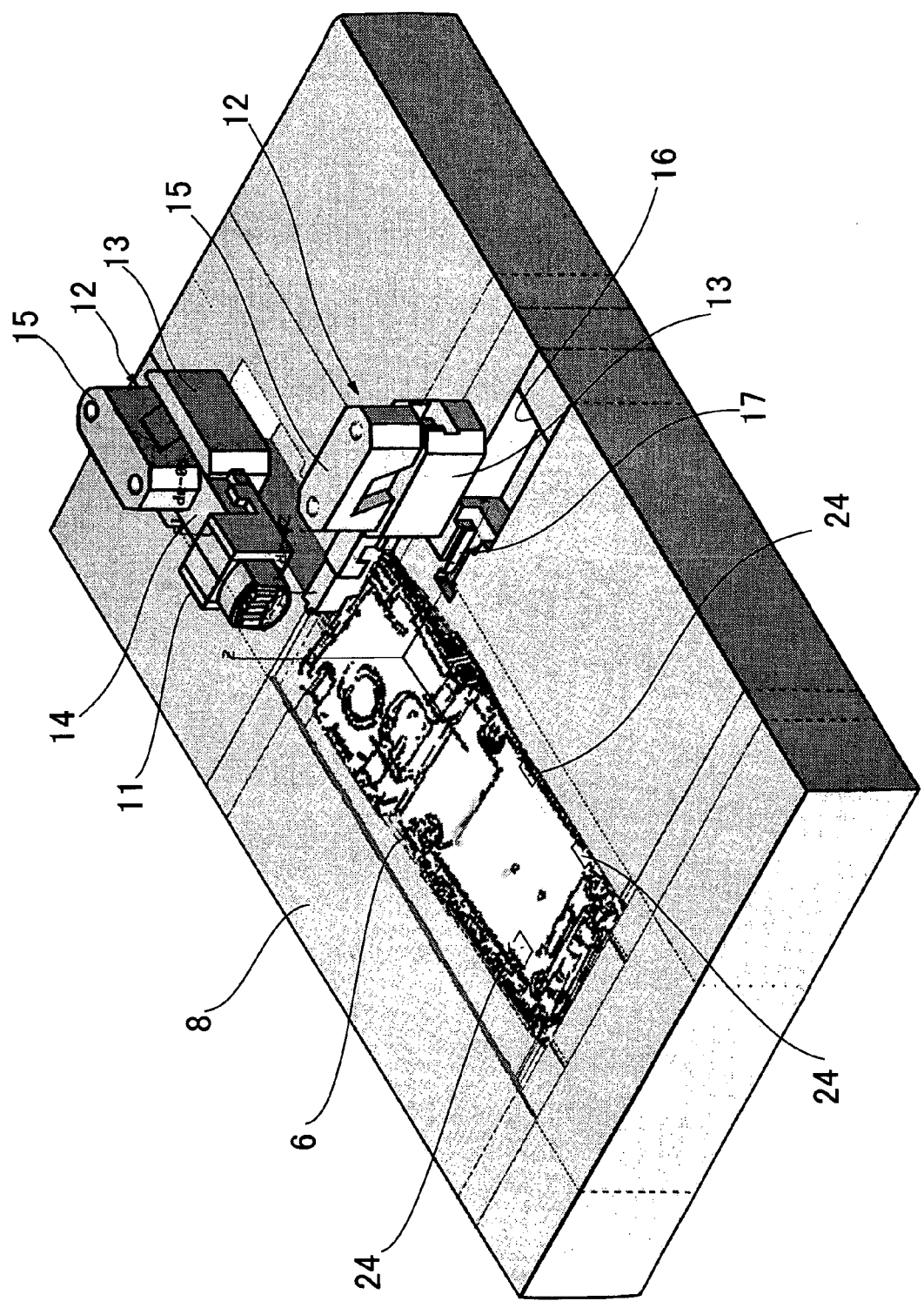
FIG. 14 is a perspective view showing the slider unit arranged to the lower die block.

FIG. 14 shows the slider unit 12 which is arranged at a desired position of the lower die block 8 in the die assembly for molding the cell phone front case 1 as shown in FIG. 7.

Figure 15:
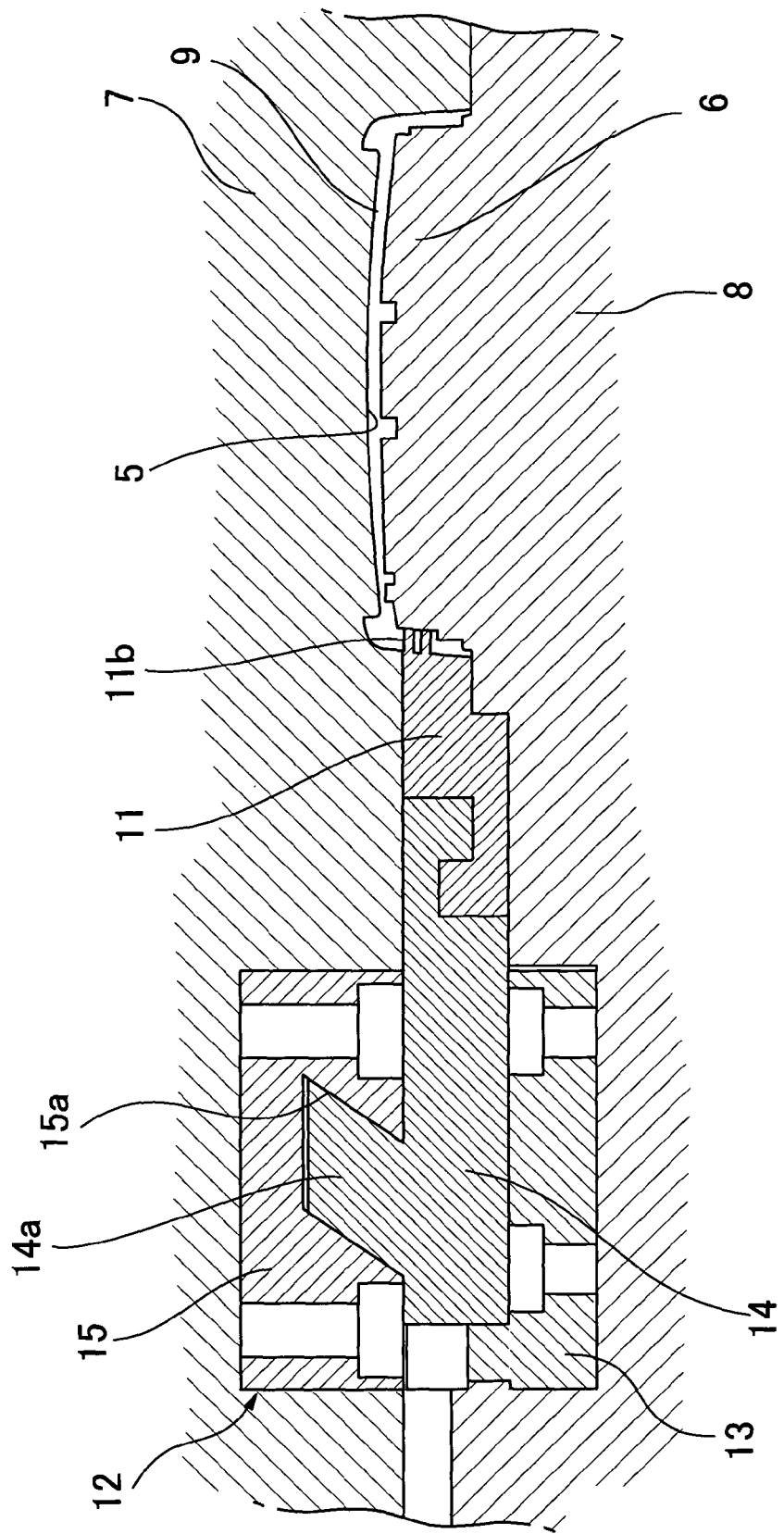
FIG. 15 is a sectional view of the die assembly having the slider unit attached thereto.

FIG. 15 is a sectional view showing the die assembly having the slider unit 12 placed therein.

Figure 16:
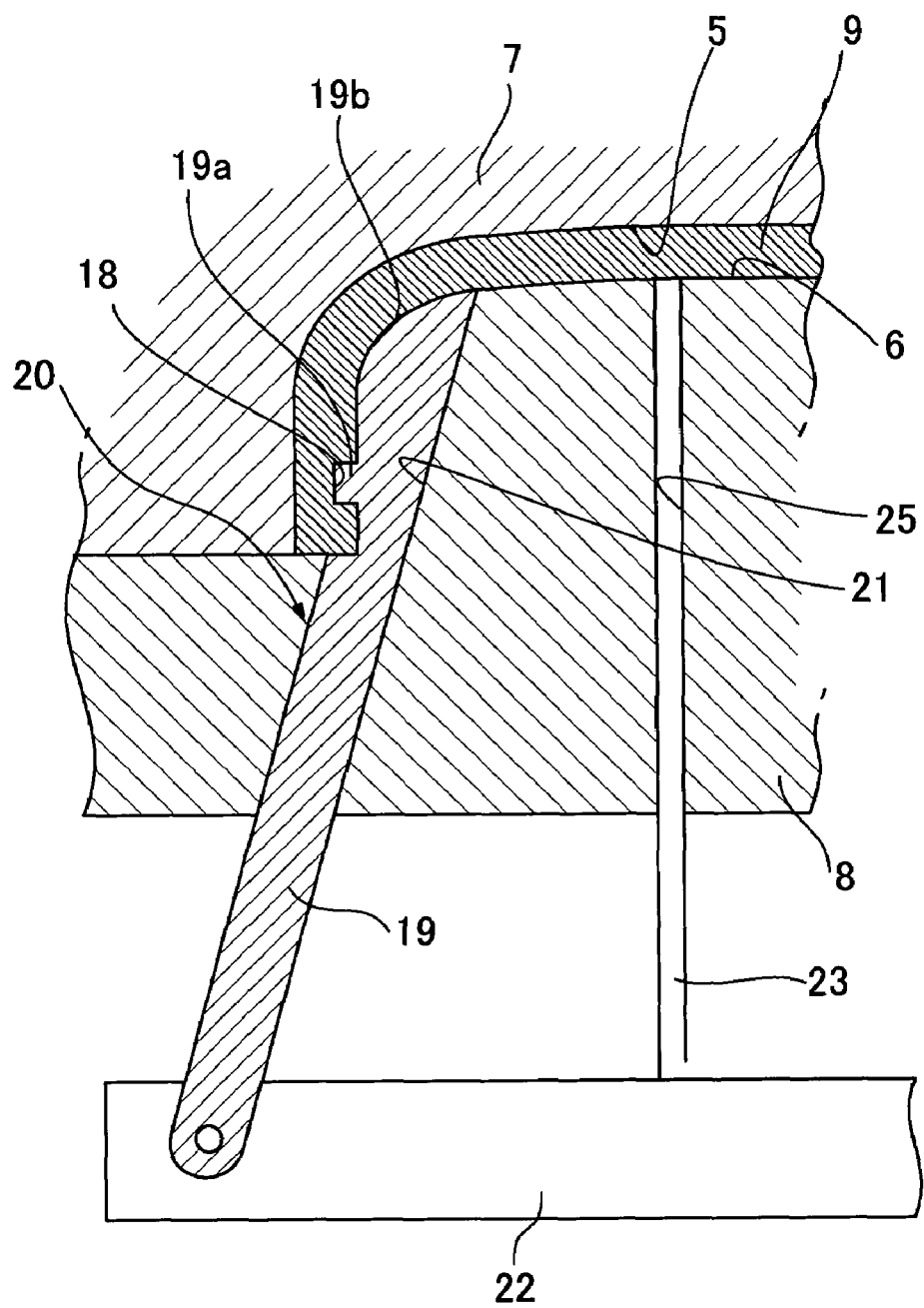
FIG. 16 is a schematic sectional view showing a lifter or spring core.

A lifter or a forming core similar thereto is arranged at a position of the die assembly corresponding to an undercut portion of the product. FIG. 16 is a schematic sectional view showing one example of a lifter. A molding cavity 9 is defined between a molding depression 5 of an upper die block 7 and a molding protrusion 6 of a lower die block 8. In some cases, it is necessary to form an undercut portion 18 in a product to be obtained by cooling and solidifying molten plastic filled in the molding cavity 9. If it is left without any treatment, the undercut portion 18 will interfere in releasing the molded product from the die blocks. A lifter 20 as shown in FIG. 16 is one of measures against this problem. The lifter 20 includes an elongate rod-shaped core member 19 which has a protrusion 19a with a shape corresponding to that of an undercut portion 18, and a molding surface 19b around the protrusion.

The lower die block 8 has a guide surface 21 located at a position corresponding the lifter 20 to extend upward with an inclination in the inward direction of the lower die block. The rear surface of the lifter 20 is disposed along the guide surface 21 of the lower die block 8.

A movable plate 22 is disposed below the lower die block 8. The movable plate 22 is adapted to move vertically while leaving a certain vertical distance relative to the lower die block 8. The lower end of the core member 19 is coupled with the movable plate 22 through a pivot pin.

In FIG. 16 the die assembly is closed. After a molten plastic material injected into the molding cavity 9 is cooled and solidified, a resulting molded product is released from the die blocks. For this releasing operation, an ejector pin 23 is attached to the movable plate 22. In the releasing operation, the lower die block 8 moves downward. This movement allows the movable plate 22 to move upward relative to the lower die block 8. Thus, the molded product is pushed upward relative to the lower die block 8 by the ejector pin 23, and released from the molding cavity 6 of the lower die block 8. During this operation, the core member 19 of the lifter 20 also moves upward relative to the lower die block 8, together with the molded product. Since the core member 19 moves along the guide surface 21 of the lower die block 8, the protrusion 19a and the molding surface 19a of the core member 19 move away from the molded product in the inward direction, so that the molded product can be completely released from the die assembly.

In FIG. 14, the reference numeral 24 indicates a position where the lifter 20 is placed.

It is necessary to arrange the ejector pin indicated by the reference numeral 23 in FIG. 16 at multiple positions in the molded product. In consideration of the shape of the molded product, the ejector pin is preferably arranged to push a region of the molded product having high rigidity. While a number of ejector pins are actually arranged for the molding product as shown in FIG. 7 in consideration of its shape, only four ejector pins 23 among them are shown in FIG. 7.

Figure 17:
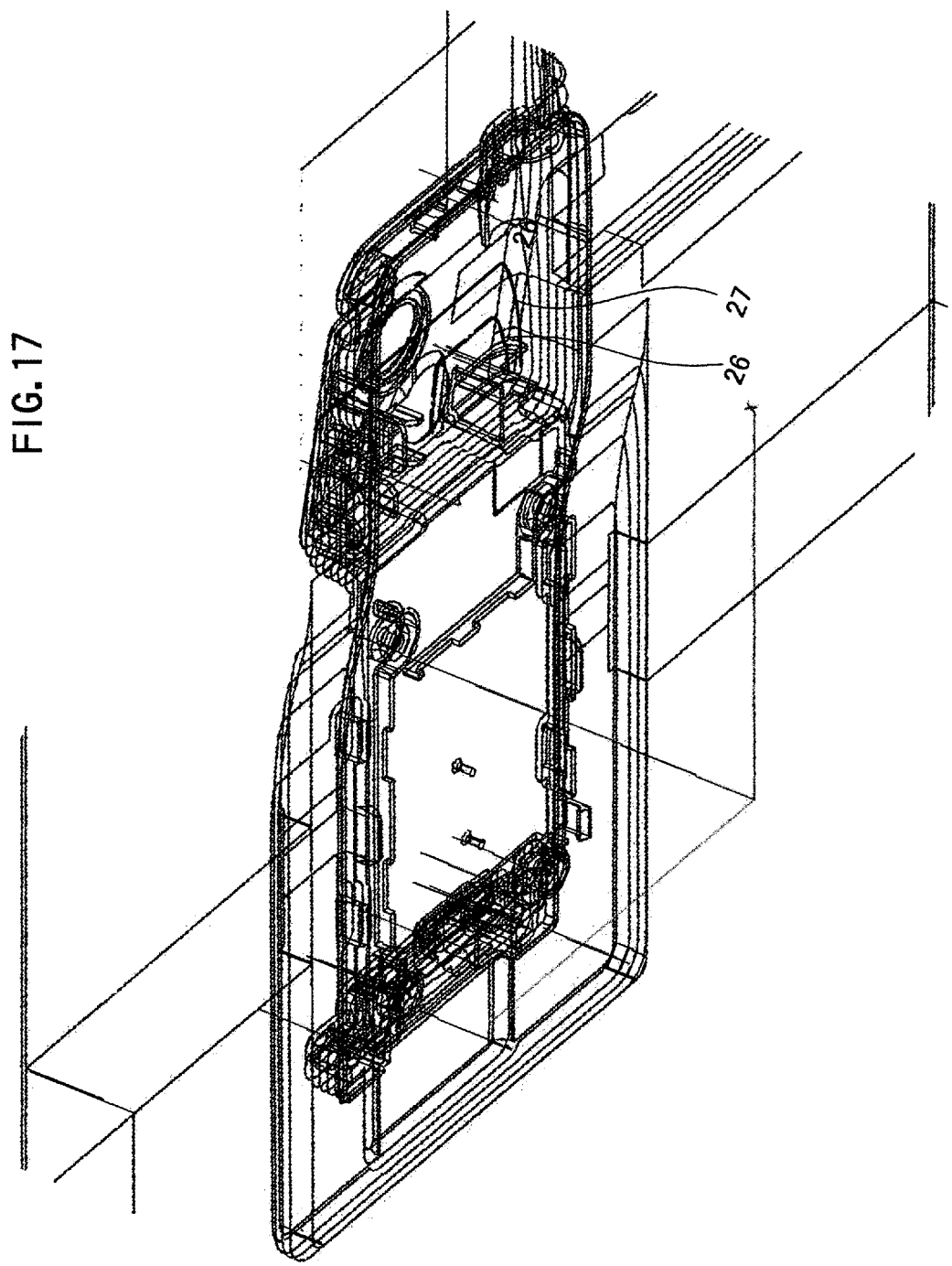
FIG. 17 is an explanatory perspective view of a subprocess for creating numerical control data.
Figure 18:
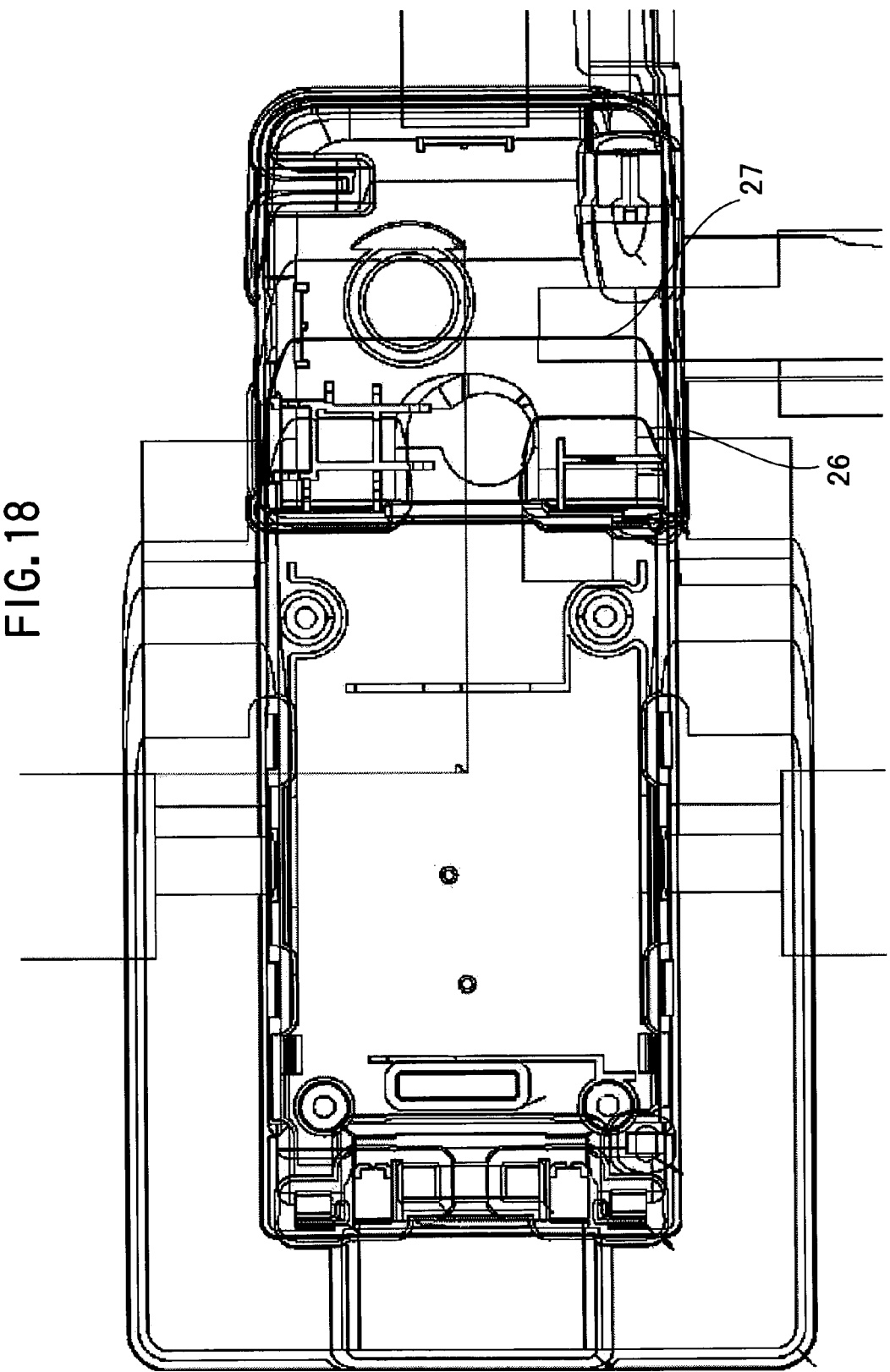
FIG. 18 is a top plan view of a die block shown in FIG. 17.

After the completion of the designs of the upper and lower die blocks 7, 8, and the insert cores including the sliders and lifters, it is necessary to create NC data or numerical control data for defining a tool path to perform a cutting operation in accordance with design data created in the above design processes. FIGS. 17 and 18 are schematic diagrams showing one example of a subprocess for creating numerical control data for cutting an upper die block for molding a product which is different from but substantially equivalent to the cell phone front case as shown in FIG. 7. In FIG. 17, each of thin lines is a contour line representing a region having the same height. The surface of the die block is first cut up to two contour lines 26 corresponding to the highest region indicated by a one-dot chain line. This cutting operation can be achieved by appropriately setting the two-way path of a cutting tool. As a first step, the numerical control data is created to define this two-way path of the cutting tool. Then, the path of the cutting tool is controlled to provide the die block surface smoothly continuing from the contour lines 26 to a contour line 27 adjacent thereto, and then to shift toward an adjacent contour line sequentially so as to cut the die block surface. The numerical control data is create to define the path of the cutting tool in this way, and stored in the form of digital data.

The created numerical control data for a cutting operation is sent to a numerical control cutting machine to perform the cutting operation of the die blocks and materials in accordance with the data.

Figure 19:
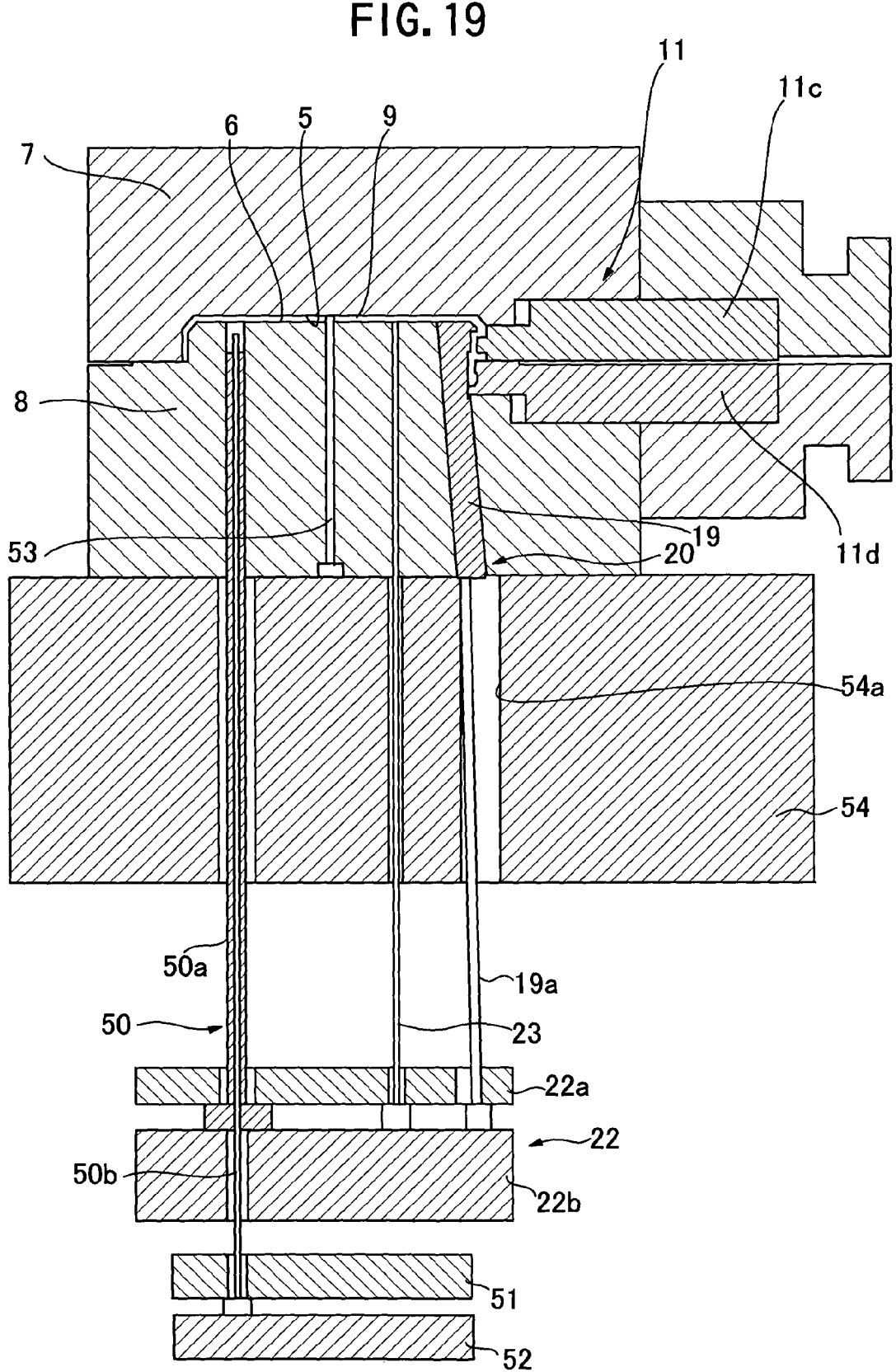
FIG. 19 is a sectional view of the die assembly.

FIG. 19 is a sectional view showing a typical die assembly. While this die assembly has approximately the same structure as that in FIG. 16, the components of the die assembly are illustrated in more detail in FIG. 19. In the die assembly of FIG. 19, a movable plate 22 supporting an ejector pin 23 comprises an upper plate 22a, and a lower plate 22b. A lifter comprises a core member 19, and a spring member 19a for attaching the core member 19 to a movable plate 22. The lower end of the spring member 19a is cramped and held between the upper plate 22a and the lower plate 22b. The lifter 20 is referred to as "spring core" in some cases, because it is supported by the spring member 19a.

In the die assembly of FIG. 19, a sleeve pin 50 is provided in addition to a regular ejector pin 23. The sleeve pin 50 includes a sleeve 50a, and a center pin 50b inserted into the sleeve 50a. The upper end of the sleeve 50a is located at a position lower than that of the surface of a molding protrusion 6 of a lower die block 8. The center pin 50b penetrates through the sleeve 50a, and the upper end of the center pin 50b protrudes upward from the upper end of the sleeve 50a. This sleeve pin 50 plays a role of forming a protrusion as illustrated in a product to be molded. More specifically, the protrusion is formed to have a hollow cylindrical shape called bosses that extend in the inward direction of the product. The lower end of the sleeve pin 50a is held between the upper plate 22a and the lower plate 22b of the movable plate 22. The lower end of the center pin 50b extends downward beyond the lower end of the sleeve 50a and is held between a center-pin stopper plate 51 and an ejector support plate 52 which are disposed below the movable plate 22.

In addition, the die assembly of FIG. 19 includes a core pin 53. The lower end of the core pin 53 is supported by a receiving plate 54 which holds the lower surface of the lower die block 8. The upper end of the core pin 53 is in contact with the surface of a molding depression 5 of an upper die block 7 after extending upward to penetrates the lower die block 8 and enter into the molding cavity 9. Such a core pin is intended to create a hole on the molded product.

While a slider 11 in the die assembly of FIG. 19 comprises a pair of cores 11c, 11d disposed vertically, its structure may be regarded as the same as that of the sliders described with reference to FIGS. 11 to 15.

Returning to the process chart of FIG. 5, the die design process reconstructed according to the concept of the present invention will be descried in more detail.

In response to the receipt of an order for production of a die assembly, an order sheet is issued. Together with the production order, product design data are supplied from a customer in the form of 3-dimensional digital data. The product design data is converted into CAD data compatible with software for use in the die design. These subprocesses are indicated by P1 and P2 in FIG. 5, which are simple or routine jobs requiring no decision. At the time this data conversion is completed, the die design is initiated.

Figure 20:
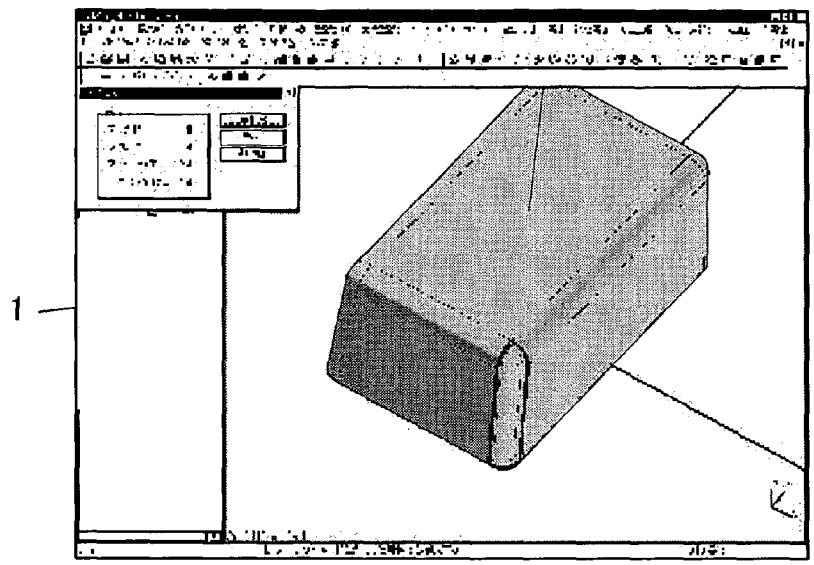
FIG. 20 is an explanatory perspective view of a subprocess for correcting product data in the die design process.

The first subprocess of the die design is a data correction subprocess P3. The data correction subprocess P3 includes a job of checking any possible defect in the converted 3-dimensional CAD data, and correcting the defect. Specifically, it is checked whether a 3-dimensional image displayed in accordance with the data includes the missing surfaces and unintended clearance, and a responsible person operates the computer to correct a detected defect manually. The corrected data is stored in the computer. FIG. 20 shows one example of a 3-dimensional image to be checked. In the 3-dimensional image, a surface 1 has a clearance due to a defect such as data discontinuity, and an unclosed corner appears therein. For example, data-checking software may be configured to indicate the presence of a data defect by displaying the entire product with light blue color if data discontinuity is found, and to display the defective region or unclosed corner with purple color, so as to allow the responsible person to readily find the defect. Check items such as a surface defect may be standardized in such a manner that discontinuity in data is determined as surface defect, and the software may be configured to display the check result to the responsible person under the support of the computer. In this case, a subprocess which should be regarded as a decision subprocess if it is executed through visual checking can be handled as a routine subprocess requiring no decision. That is, a die-design engineer can execute this job as a simple routine subprocess by checking the defect of the data and immediately correcting a detected defect. Thus, according to this embodiment of the present invention, the data correction subprocess otherwise been regarded as a decision process can be handled as a routine subprocess requiring no decision to reduce the number of decision subprocesses in its entirety.

Figure 21:
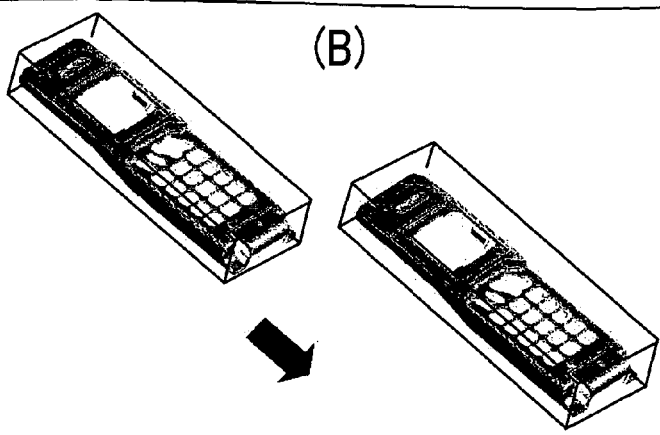
FIG. 21 is a perspective view showing a subprocess for placing product data and adding the shrinkage.

The next subprocess P4 is a "Mold Layout/Add Shrinkage Ratio" subprocess. In an injection molding process for plastic products, a final product has a smaller dimension than that immediately after molding due to shrinkage caused in resin material. In the die design process, information about a resin material to be used has been provided from a customer, and stored as history information on the order. In the subprocess P4, this history information is first checked to read out the shrinkage ratio of the resin material. Then, the respective dimensions of the resin material before and after adding shrinkage are calculated for each of three directions X, Y, Z. FIG. 21 shows one example of a computer display image for use in the subprocess P4. In this example, the shrinkage ratio of the resin material is 0.5%. The product data is enlarged by this shrinkage ratio, and stored as corrected data. FIG. 21B shows an image of correction data. This subprocess is classified as a simple or routine job requiring no decision.

Subsequent to the "Add Shrinkage Ratio" subprocess, a "Fix Layout" subprocess P5 is executed. In this subprocess, a responsible person or a terminal computer user applies the product data to a pre-standardized die block, and checks whether the product data fall within the block. The respective shapes of the product data and the die block are displayed as an image. In this subprocess, the layout is fixed in consideration of not only whether the product data fall within the block but also whether necessary components such as a sliders and lifters can be placed without interference. Thus, this subprocess is an important decision subprocess having an impact on subsequent subprocesses. Further, in terms of the type of runner serving as a passage of molding resin, either one of hot and cold runners is selected in this process. This selection is determined according to the shape of the product.

Figure 22:
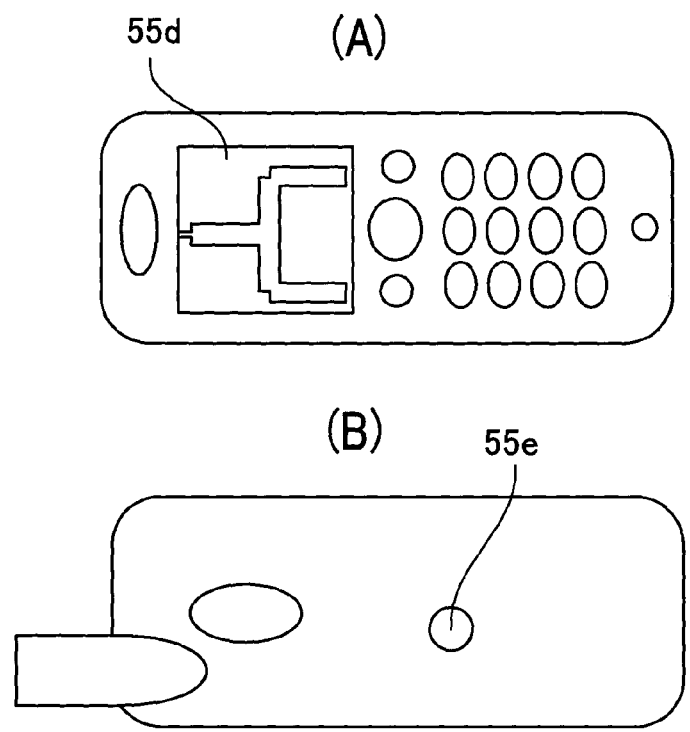

If a hot runner is selected, a hot runner aperture is layouted in the die block. As one example, the layout of a spool 55a, a runner 55b and a gate 55c is shown in FIG. 22. A parting line PL or parting surface between the upper and lower dies is also fixed in this subprocess.

Figure 23:
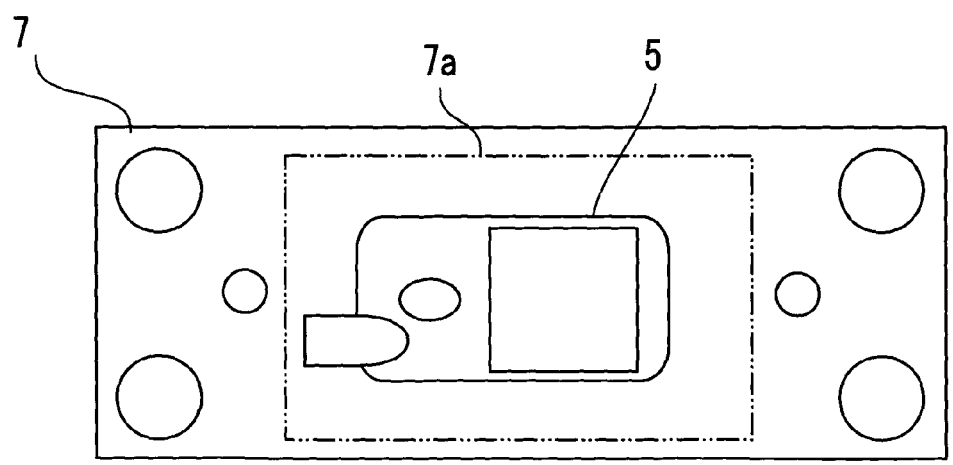
FIG. 23 is a schematic top plan view showing the product data placed in the die block.

FIG. 22 shows the type of gate, wherein FIG. 22A shows a side gate 55d, and FIG. 22B shows a direct gate 55e. FIG. 23 shows the product data placed in the die block. As shown in FIG. 23, a rectangular line 7a is displayed on the computer screen to indicate an allowable layout range of the product data. In consideration of the type of gate, the product data is positioned in the allowable range.

If an alternative of the parting line PL displayed on the screen is acceptable, the user can click a "decision" button displayed on the computer screen to fix a surface along the displayed parting line PL as a parting surface. If the parting line PL displayed on the screen is not acceptable, the user can click an "Alternative" button to display a parting line as the second alternative. In this way, an optimal parting line can be selected while displaying several alternatives.

In response to the fixing of the parting line PL, the system will automatically choose a die block 7 and 8 optimal to the dimensions and shapes of the depression 5 and the protrusion 6 and display on the computer screen, for example, as shown in FIG. 9 or 10.

After the die block position is fixed, it is studied whether sliders can be placed. What considered mainly is whether a slider can be reasonably placed, particularly, with respect to the dimension in the height direction. If there is not any margin for reasonably placing the slider in the height direction, the user may adjust the position of the product data in the height direction to allow the slider to be adequately placed.

Figure 24:
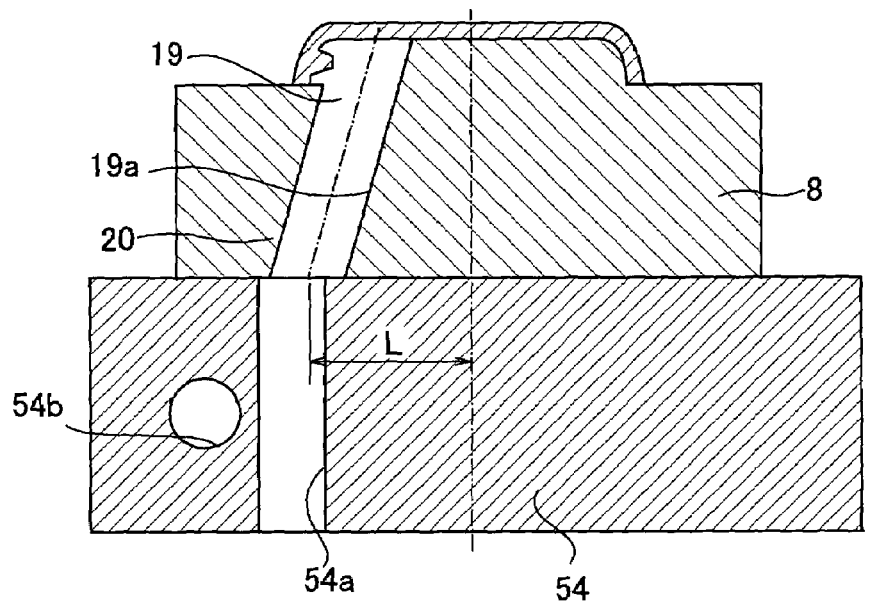
FIG. 24 is a sectional view showing the allowable range for placing the lifter or spring core.
Figure 26:
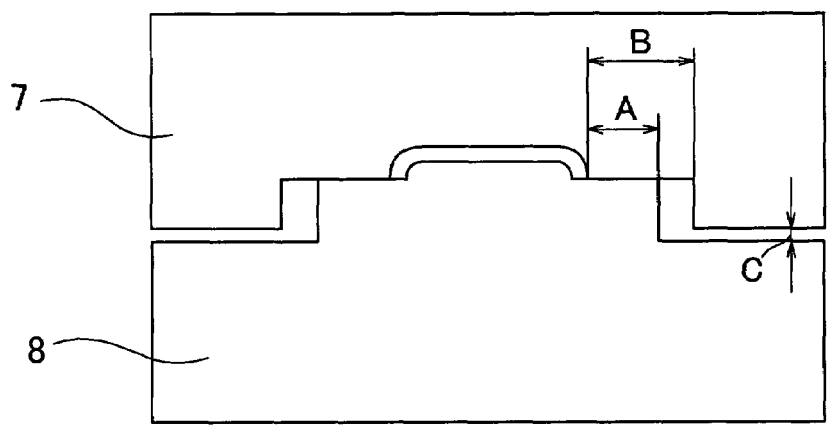
FIG. 26 is a sectional view showing upper and lower dies matched together.

Then, the user will study whether a lifter or spring core 20, for example, as shown in FIG. 24 can be adequately placed. The user will consider whether an escape hole 54a, for the spring core 20, in a receiving plate interferes with a coolant hole 54b formed in the same receiving plate 54, and whether a horizontal distance from the center of the die is in an allowable range. FIG. 24 shows this relationship. The distance L between the center of lower end of an aperture 19a formed in a lower die 8 to receive a core member 19 therein and the center of the lower die 8 is required to set in a given value positively in both the width and longitudinal directions of the dies. In an example of an outer case for cell phones as shown in FIG. 26, the distance L should be minimum of 23.4 mm and 73.9 mm, respectively, in the width and longitudinal directions of the dies. In addition, the lateral displacement between the center of the lower end of the aperture 19a of the lower die 8 and the escape hole 54 formed in the receiving plate 54 is set at 2.0 mm. The distance between the respective edges of the escape hole 54a and the coolant hole 54b is required to be minimum of 1.0 mm.

The position of the product data is fixed in consideration of the aforementioned various requirements. Problems which would otherwise occur in subsequent subprocesses can be avoided in advance by fixing the layout in consideration of all of conditions having an impact on the positions of various components in the subsequent subprocesses.

Figure 25:
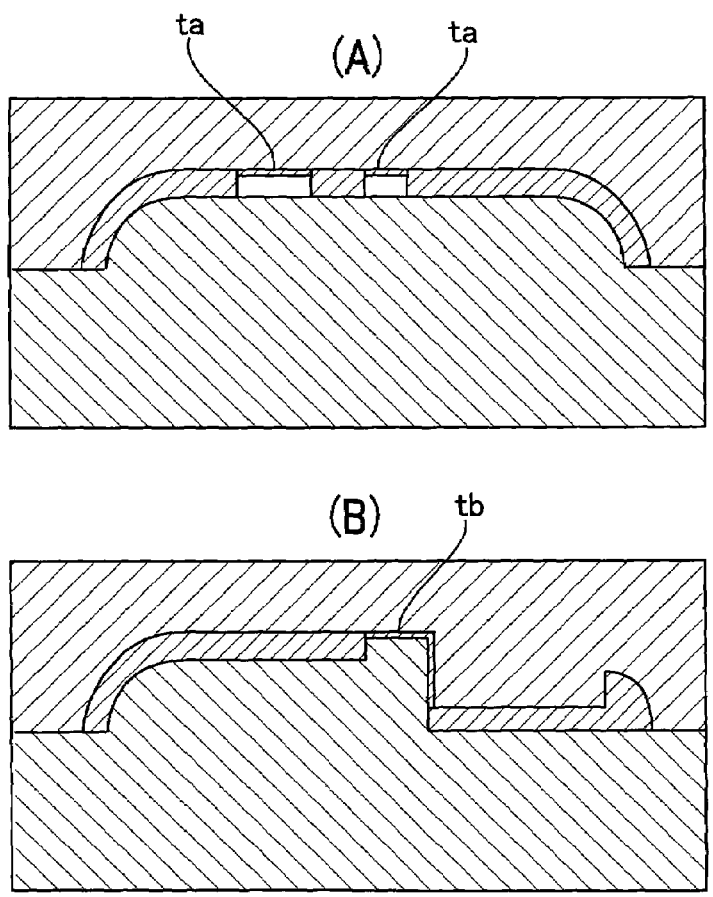
FIG. 25 is schematic sectional views showing the formation of a parting surface at an aperture or other openings, wherein FIG. 25A show the formation of a parting surface at an opening such as button apertures.

Subsequent to the subprocess P5, a "Create Parting Surface" subprocess P6 is executed. This subprocess includes a job of operationally adding parting surfaces on to the holes of the product data in preparation of separating upper and lower dies. FIGS. 25A and 25B show one example of a subprocess for forming parting surfaces ta, tb.

Then, a "Separated Upper/Lower Die" subprocess P7 is executed. As descried in conjunction with FIGS. 7 and 8, this subprocess includes a job of choosing parting lines of upper and lower dies, and registering the data of upper and lower dies separately to allow the respective data to be processed in separate process flows. Both the subprocesses P6 and P7 are classified as a routine subprocess requiring no decisions.

According to one embodiment of the present invention, in a specific die assembly, for example, an injection molding die assembly for a cell phone outer case, as shown in FIG. 26, each of the respective widths A, B of lower and upper die 8, 7 of the matching surface between the upper and lower does 7, 8, and the clearance C in a general parting surface is set at a constant value. In this way there is no decision necessary in the upper/lower separation subprocess. Thus, a subprocess otherwise being regarded as a decision subprocess can be handled as a routine by setting a single condition as a condition otherwise requiring decision, reducing the number of decision subprocess.

Figure 27:
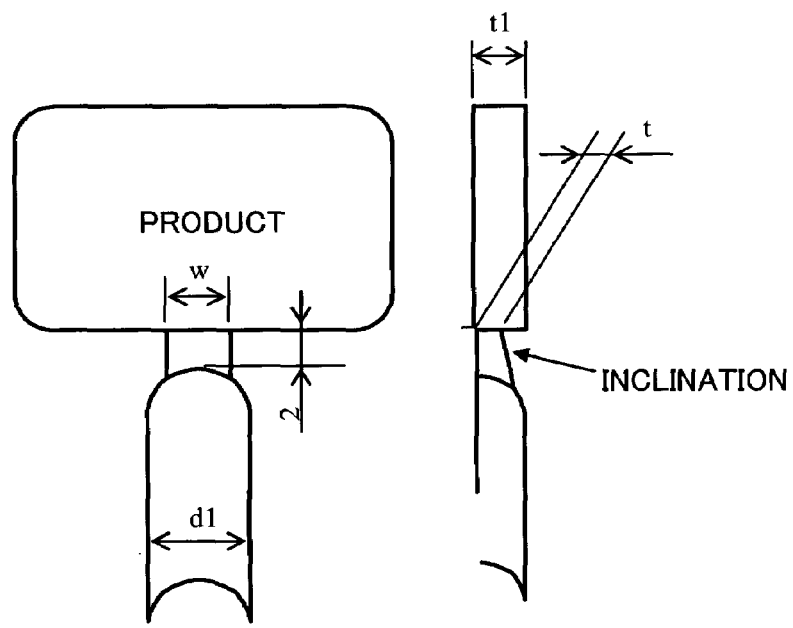
FIG. 27 is diagrams showing one example of standard gate.

A subsequent subprocess is a "Fix Gate/Spool Position" subprocess P8. This subprocess includes a job for fixing the respective positions of the spool 55a, the runner 55b and the gate 55c for injecting molten resin into the molding cavity 9. FIG. 27 shows one example of a side gate.

When design data of a gate in the "Fix Gate/Spool Position" subprocess P8 is created, conditions, such as the width d1 of a runner portion, the width w or thickness t of a gate portion or the presence of the inclination in the gate potion, may be preset for each type of resin to be used, reducing the number of decision subprocess drastically.

Subsequent to the "Fix Gate/Spool Position" subprocess P8, a "Fix Runner Path/Curvature-radius" subprocess P9 is executed. This subprocess P9 includes a job for fixing the position and shape of the runner 55b. These subprocesses P8 and P9 are classified as a decision subprocess. Depending on the shape and size of a product, each of the spool, runner and gate may be limited to a single type and the path and curvature radius of the runner may be limited to a single type accordingly, so as to necessarily use the predetermined type of spool, runner, gate, and the path and curvature radius of the runner. In this case, the subprocesses P8, P9 otherwise being classified as a decision process can be handled as a routine subprocess.

A subsequent subprocess is a "Fix Sleeve Pin Position" subprocess P10. In addition to a job for fixing the position of the ejector pin 23, this subprocess includes a job for determining if the sleeve pin described in conjunction with FIG. 19 is necessary, and, if necessary, fixing the size and position of the sleeve pin. Subsequently, a "Choose Slider Type (Stroke)" subprocess 11 is executed to determine if a slider or a lifter is necessary, and, if necessary, fixing the type and the amount of stroke thereof. The subprocesses P10, P11 are classified as a decision subprocess.

After the completion of the subprocess P11, a "Create Sliders" subprocess P12 and a "Create Lifters" subprocess P13 are sequentially executed.

These subprocesses can be executed through a manual operation of fixing the size and type of the slider unit 12 in FIG. 14, position a cursor to a given position while viewing the computer screen, and clicking the position. A program incorporated in the computer is configured such that when the size and type of the slider unit 12 are fixed, and the position of the slider unit is designated, each of a concave portion 16 for fittingly receiving a slide guide 13, and a groove 17 for allowing a movable member 14 and a slider 11 to slide therealong is automatically depicted at the designated position of the lower die block 8.

The design of the slider unit is executed as a job in a separated process flow. A standardized component is applied to each of the slider guide 13 in the slider unit 12, the movable member 14 and the locking block 15. More specifically, several different sizes, shapes and types of slider units are prepared, and an optimal one is manually selected therefrom depending on the size, shape and position of a molding core 11b in FIG. 12 required for molding a product. The result of this selection is also used in forming the concave portion 16 and the groove 17 in the lower die block of the aforementioned die assembly. In the design process of the slider unit 12, the user will select the standardized slider units depending on the level of an undercut. FIG. 28 shows one example of a material for sliders standardized and registered in the form of 3-dimensional data in advance. In the table described at the top of FIG. 28A, numerals in the column of size indicate the length, width and thickness, respectively, in turn from left to right. The above standardized material is a material having a length of 150 mm and a width of 15 mm as illustrated just below the table, and three kinds of standardized materials each having a different thickness are prepared. Typically, a material to be used is appropriately selected from the standardized materials. Only if the standardized materials cannot be used, an appropriate material is selected from other materials having a length of 300 mm and a width of 300 mm, and the selected material is cut through a wire cut process to form a slide as shown by a wire cut material in the bottom of FIG. 28A. The standardized slider unit comprises a pre-combined set of the slider guide 13, the movable member 14 and the locking block 15. Further, a material having a size and shape large enough of cutting out the movable member 14 is selected and used for the slider 11. Then, a molding core 11a having a desired shape and size is formed at the front end of the selected material. The formation of the molding core 11a is executed through a computer processing in accordance with information from the design data of the product, front case 1.

Figure 28B:
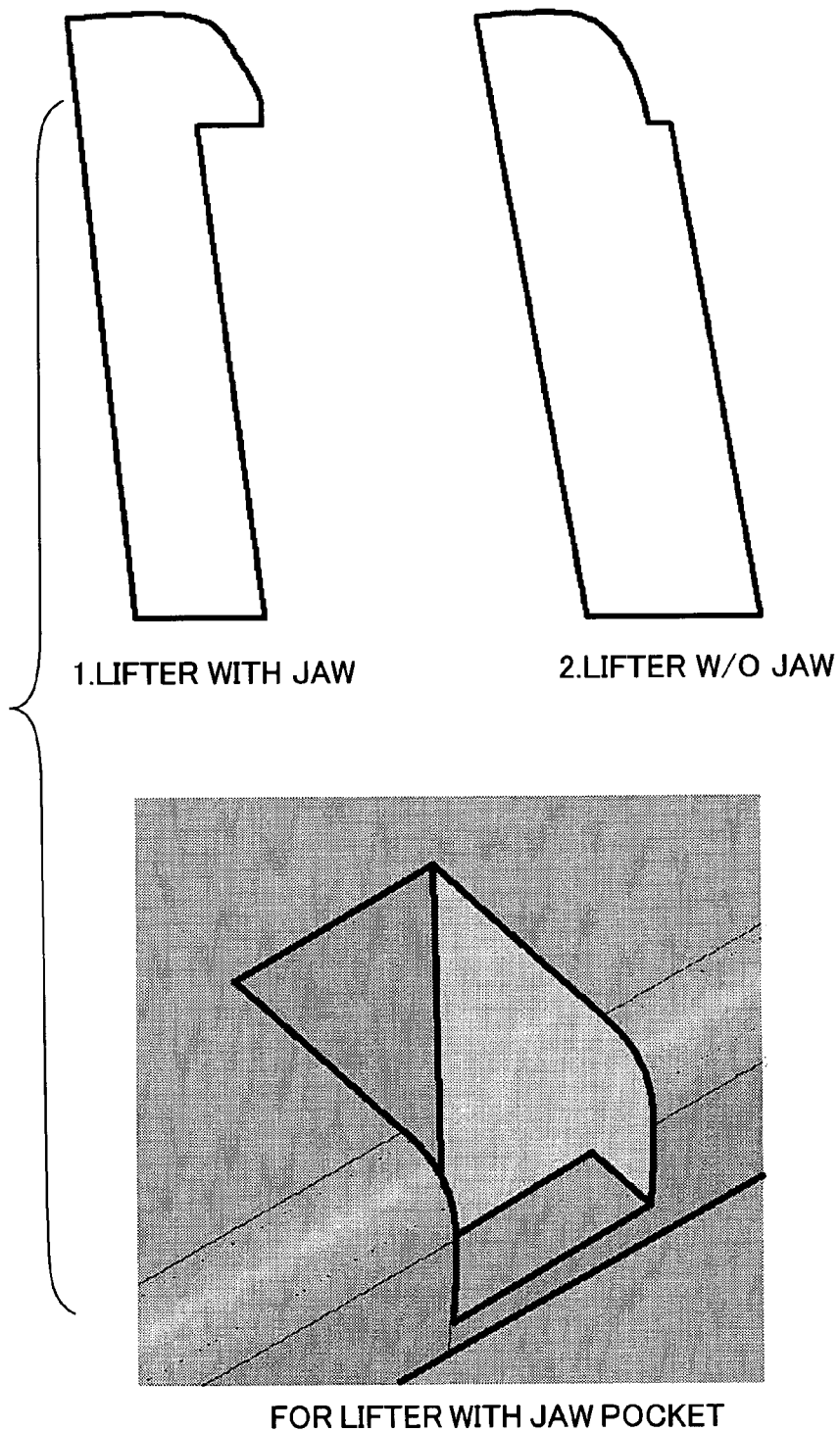
FIG. 28B is diagrams showing one example of a standard lifter.
Figure 28C:
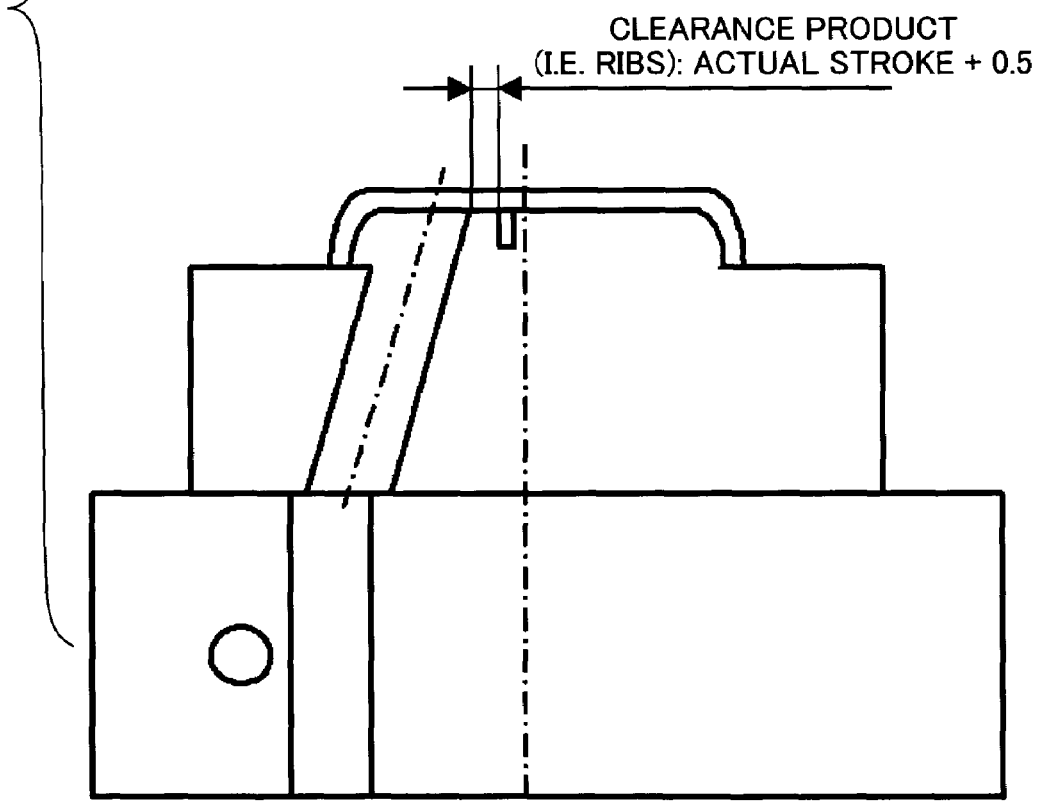
FIG. 28C is diagrams showing one example of a table for fixing the dimensions of a lifter.

In the same way, the core member 19 of the lifter 20 is designed by preparing a number of materials for the core member, designating an optimal one among different sizes and types of standardized materials registered in the computer in the form of 3-dimensional data, and forming a protrusion 19a and a molding surface 19b having a desired shape. The design data of the protrusion 19a and the molding surface 19b can be created in accordance with the data of the product in FIG. 7. FIG. 28B shows one example of the shape of the core member 19 of the lifter 20 standardized and registered in the computer in the form of 3-dimensional data, and FIG. 28C shows a table for fixing the dimension of the lifter. As shown in FIG. 28, the lifter design can be adequately executed depending on the size of undercut.

When the size and type of the core member 19 of the lifter 20 is fixed, and their positions are designated, a desired shape of the guide surface 21 is written in the lower die block 8 on the computer screen, and stored as the digital design data.

As the ejector pin 23, several kinds of ejector pins each having a different diameter are prepared as standardized components. After the position of the ejector pin 23 is fixed, an ejector pin having an optimal diameter is selected depending on the shape and dimension of a product. In response to the fixing of the diameter of the ejector pin, its length is automatically fixed. Simultaneously, a hole 25 corresponding to the ejector pin 23 is formed in the lower die block 8, and the resulting data is stored as the design data. In this way, the design of the ejector pin 23 is completed only by fixing the position of the ejector pin 23 and selecting the diameter of the ejector pin 23 from the standardized components. In addition, the design of associated components, for example the hole 23 and groove of the ejector pin 23, will also be automatically designed by the system.

This subprocess 13 also includes a job for forming an ejector-pin groove for guiding the ejector pin 23. Since the design data of the ejector-pin groove has been fixed in the "Fix Sleeve Pin Position" subprocess, and the position and standardization type of the sliders and lifters has also been fixed in the precedent subprocess, each of the subprocesses P12 and P13 will simply execute the fixed conditions in the precedent decision subprocess on the computer according to the job-support computer program. Thus, these the subprocesses P12 and P13 are classified as a routine subprocess requiring no decision. After the completion of the "Create Sliders" and "Create lifters" subprocesses P12 and P13, the slider and lifter data are registered as a separate component.

A "Create Inserts" subprocess P14 is subsequently executed. This subprocess P14 includes a job for creating data of inserts to be arranged in the molding cavity 9, such as the core pin 53 descried in connection with FIG. 19, and registering the created data in the computer as one component.

Finally, a parting check subprocess P15 is executed. This subprocess includes a job for checking whether the design data on each of the upper and lower dies is adequate. The subprocess P15 is classified as the most important decision subprocess as the final decision subprocess.

FIG. 29 schematically shows a management system of managing the jobs for creating the die design and preparation data. A central processing unit 60 is connected with a number of terminal computers 61A, 61B, 61C, 61D, 61E, 61F via a network. The central computing unit 60 is provided with a job distribution server 60a which is connected to a job management database 60b, job-skill-level management database 60c and a file management server 60d.

As shown by a fragmentary enlarged view in FIG. 29, process charts 62 for a plurality of orders are stored in the job management database 60b. The process chart 62 may be the same type as that in FIG. 5. In the example of FIG. 29, 01-type, 02-type and 03-type of process charts are prepared by numbering in sequence of order-receipt timing. This number represents the priority level of job. Further, in each of the process charts, each of subprocesses is also numbered. This number represents the sequence of initiation timing, and it means that either one of two or more subprocess having the same number may be initiated earlier. When one subprocess is completed, this information is recorded in an operation management list associated with a corresponding process chart 62.

The job-skill-level management database 60c stores a list for describing therein data on subprocesses which can be executed by a user of each of the terminal computers, or a job-skill-level list. For example, when represented by the indication of the process chart 62, if the user of the terminal computer 61A has an ability of executing the jobs in the subprocess 2, 3 and 4, but any jobs in other subprocess cannot trust to the user, this information is stored in the job-skill-level management database as the skill level of the terminal computer 61A. In the same way, the user's skill level of each of other terminal computers is stored in the database.

Figure 30A:
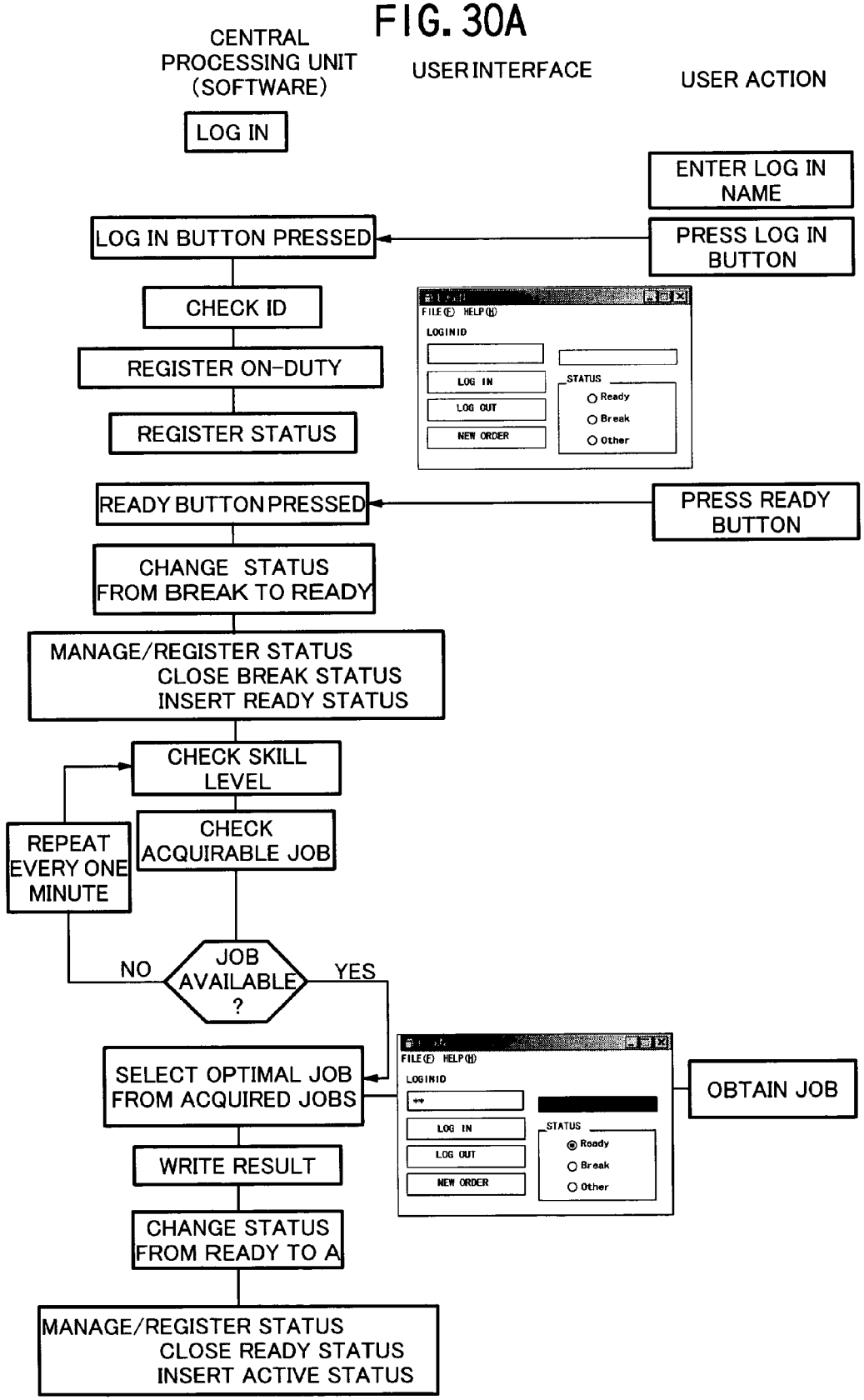
FIG. 30A is a flowchart showing a login process in the system of FIG. 29.

FIG. 30 is a flow chart showing the function of a die design system constructed by the central computing unit 60 and the terminal computer 61, wherein FIG. 30A shows a login stage in the system. A system interface in FIG. 30A is enlarged and separately shown in FIG. 30E. After coming to the office and being ready for job, a user first enters a login ID through a system interface, and pushes a login button. In response to this operation, software recognizes the push of the login button, and registers the status of the user. In the job distribution server 60a, the central computing unit 60 has a terminal status list for recording the status of the terminal computer handled by the user. At this moment, the status of the use is "BREAK", and this information is recorded in the terminal status list.

If ready to initiate a job, the user pushes a "READY" button in the system interface. Thus, the software recognizes the push of the READY button, and changes the status of the user from "BREAK" to "READY". Then, the software acquires the job skill level of the user from the job-skill-level management database to check any executable job for the user through retrieval of the job management database 60b. An optimal job for the user is selected by sorting the data according to the priority level of the order, and then selecting the sequence of the initiation timing, or the subprocess having the smallest number. The selected job is distributed to the terminal computer of the user to allow the user to execute the assigned job. Then, the software writes a resulting job performance into a performance management table included in the job management database. In this writing operation, time required for the user to execute the assigned job. Further, the software changes the status of the user from "READY" to "ACTIVE".

Figure 30B:
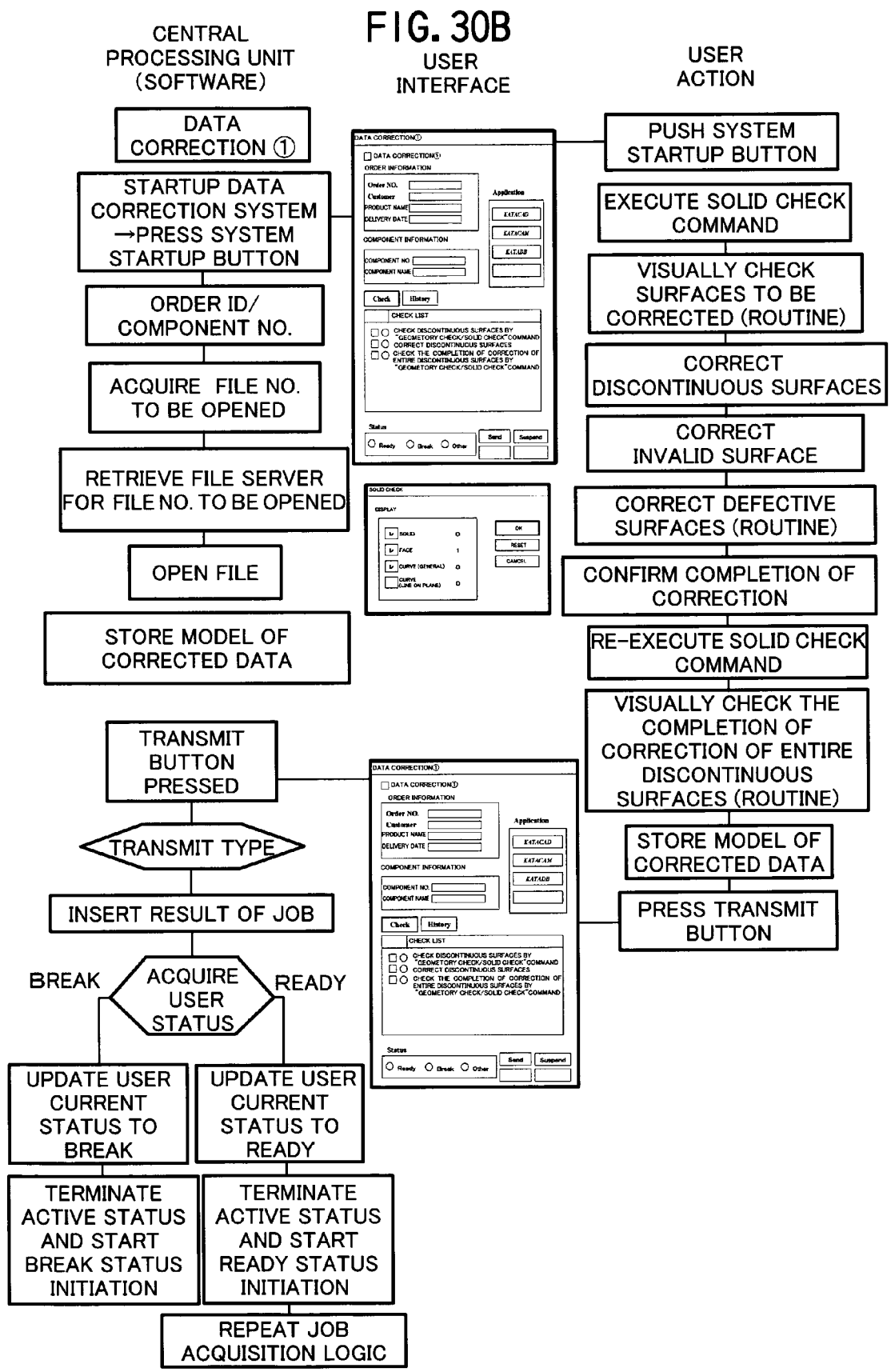
FIG. 30B is a flowchart showing a data correction sprocess.

FIG. 30B is a flowchart showing a data correction process. A system interface in FIG. 30B is enlarged and separately shown in FIGS. 30F, 30G, 30H. A user pushes a system startup button through a system interface. In response to this operation, software activates a data correction system having a solid check command to acquire a file number to be opened according to an order number. Further, the software retrieves the job management database 60b based on the acquired file number to open a 3-dimensional model of a product in question from the file management server 60d.

Then, the user pushes a transmit button to notify the completion of the job. The user also notifies the software of whether his/her status is "READY" or "BREAK". In response the transmitted information from the terminal computer, the software writes the information of the result, or the completion of the subprocess, into the performance management table. Further, according to the status notified from the user, the software rewrites the user' status to "READY" or "BREAK".

Figure 30C:
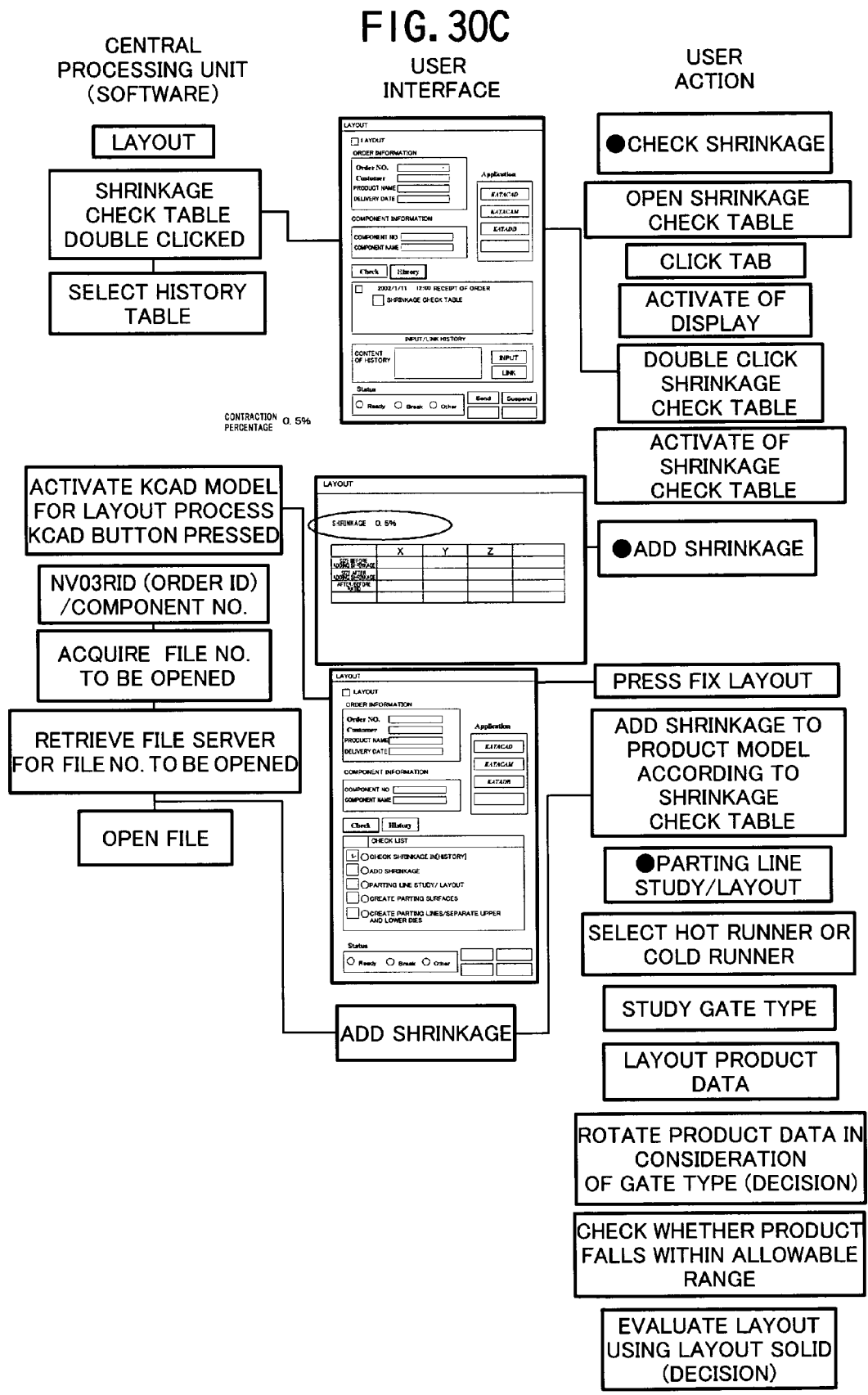
FIG. 30C is a flowchart showing a layout process.
Figure 30D:
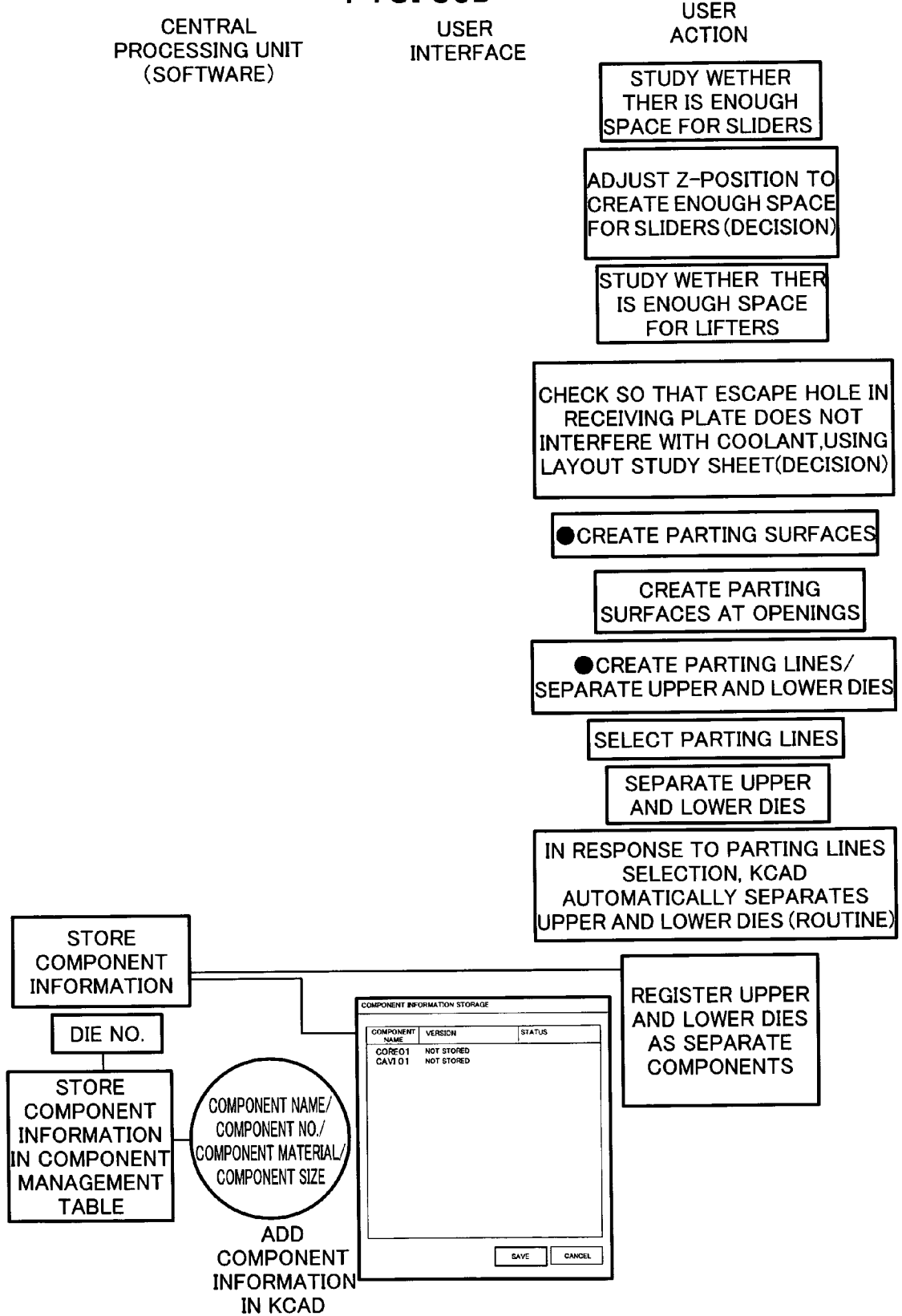
FIG. 30D is a flowchart following on FIG. 30C.

FIGS. 30C and 30D are flowcharts showing jobs between the "Fix Layout" subprocess and the "Separated Upper/Lower Die" subprocess. A system interface in FIG. 30C is enlarged and separately shown in FIGS. 30I, 30J, 30K, and a system interface in FIG. 30D is enlarged and separately shown in FIG. 30L. A user clicks "JOB HISTORY" tab to display a job-history screen of on the system interface. Then, the user double-clicks a shrinkage ratio table on the screen to activate the shrinkage ratio table. The software recognizes the double-click of the shrinkage ratio table, and selects the JOB HISTORY table of a subprocess in question to display it on the system interface. The shrinkage ratio is predetermined according to resin to be used. In the illustrated example, the shrinkage ratio is 0.5%. The user executes an operation of adding the displayed shrinkage ratio to reflect shrinkage to a product shape.

The user pushes a layout fixing system button through a system interface to activate the system. The software recognizes the push of the layout system fixing system button to acquire a file according to an order number, and open a model from the file management 60d. For example, the model to be open is the image as shown in FIG. 7, and displayed together with a die material block. Then, the shrinkage of the resin is added to the displayed model to create corrected data. The corrected data will be the image as shown in FIG. 21B. Subsequently, a parting line PL is fixed. The fixing of the parting line PL is executed through the same method as that descried in connection with FIG. 7. Then, the respective types of a runner for injecting resin therethrough and a gate as a resin inlet are fixed. These types are fixed in consideration of the shape of a product and the type of resin to be used. The type of the runner is fixed by selecting from a hot runner and a cold runner, and the type of the gate is fixed by selecting from a side gate and a direct gate. A layout is fixed in consideration of the above fixed types of runner and gate.

After the layout is fixed, the user may discontinue the job concerning this order. In this case, the created data is saved in the file management server 60d, and then information about his/her current status is transmitted.

While the present invention has been described in detail with reference to specific embodiments, the process and program of the specific embodiments are made by way of example rather than to limit the scope of the present invention. Therefore, it is intended to cover within the spirit and scope of the invention all changes and modifications.

What is claimed is:

1. A method of constructing and executing a process, comprising the steps of:
    (a) minutely dividing a process into a plurality of unit subprocesses consisting of one or more decision subprocesses requiring to set up an unknown condition in the execution of each of jobs thereof and one or more routine subprocesses executable according to a predetermined procedure without any decision-making, and storing information on said minutely divided subprocesses into a storage section of a computer in the form of computer-readable data;
    (b) classifying any subprocess which is executable using the setup condition in specific one of the decision subprocesses into the routine subprocess in such a manner that said classified routine subprocess follows on said specific decision subprocess, and storing the information on said classified subprocesses into the storing section of said computer in the form of computer-readable data;
    (c) combining one or a series of the decision subprocesses with one or a series of the routine subprocesses which are executable on the condition of the completion of corresponding said decision subprocesses to form one unit process, in accordance with the data produced in said steps (a) and (b), creating a job-support computer program to allow said plurality of subprocesses included in said one unit process to be successively executed under the support of said computer, and storing said computer program into the storing section of said computer; and
    (d) setting up said unknown condition as an input of said computer in the decision subprocess, and running the computer according to said computer program, whereby all of the routine subprocesses included in said one unit process are successively executed under the support of said compute to complete said process.

2. The method as defined in claim 1, wherein a single standardized condition is preset as a condition for decision-making, and said job-support computer program is configured to display on said computer whether said standardized condition is satisfied, whereby the subprocess otherwise being classified into the decision subprocess can be handled as the routine subprocess to reduce the number of the decision subprocesses.

3. The method as defined in claim 1, wherein a plurality of options concerning said condition for use in the decision subprocess are prepared as a standardized condition to allow said decision subprocess to be executed by selecting one of said options on said computer.

4. The method as defined in claim 3, wherein one of said plurality of options which could otherwise be prepared as a standardized condition is preset as the condition for decision-making in at least one of the decision subprocesses, whereby said subprocess otherwise being classified into the decision subprocess can be handled as the routine subprocess to reduce the number of the decision processes.

5. The method as defined in either one of claim 1, wherein if some jobs between said plurality of subprocesses included in said one unit process consisting of said decision and routine subprocesses are executable in parallel, said job-support computer program in said step (c) is configured to allow said jobs to be executed in parallel.

6. The method as defined in either one of claim 1, wherein input information required for initiating the job in each of the subprocesses and output information to be created after the completion of said job are specified to construct a job flow such that one subprocess using the output information from another subprocess as the input information for initiating the job in said one subprocess successively follows on said another subprocess, and said job flow is incorporated into said computer program.

7. A method of constructing and executing a process, comprising the steps of:
- (a) minutely dividing the process into a plurality of unit subprocesses consisting of one or more decision subprocesses requiring a decision-making for executing each of jobs thereof and one or more routine subprocesses executable according to a predetermined procedure without any decision-making, and storing information on said minutely divided subprocesses into a storage section of a computer in the form of computer-readable data;
- (b) classifying any subprocess which is executable using the setup condition in specific one of the decision subprocesses into the routine subprocess in such a manner that said classified routine subprocess follows on said specific decision subprocess, and storing the information on said classified subprocesses into the storing section of said computer in the form of computer-readable data;
- (c) combining one or a series of said decision subprocesses with one or a series of said routine subprocesses executable on the condition of the completion of corresponding said decision subprocesses to form one unit process, in accordance with the data produced in said steps (a) and (b), creating a job-support computer program to allow said decision and routine subprocesses included in said one unit process to be successively executed, so that said plurality of unit processes can be executed in a predetermined sequential order under the support of said computer, and storing said computer program into the storing section of said computer; and
- (d) running the computer according to said program, whereby one of the unit process is executed under the support of said computer, and the unit processes following on the executed unit process are executed under the support of said computer according to said program in the same way to complete said process.

8. A computer program product stored in a computer storage media comprising a job-support computer program wherein the job-support computer program comprises: first computer-readable digital data representing a known process which is minutely divided into a plurality of minimum unit subprocesses, wherein said plurality of minutely divided minimum unit subprocesses are classified into a decision subprocess requiring a decision-making for executing a job therein and a routine subprocess which is executable according to a predetermined procedure without any decision-making; second computer-readable digital data representing a process wherein one or a series of the decision subprocesses are combined with one or a series of the routine subprocesses executable on the condition of the completion of corresponding said decision subprocesses to form one unit process, in accordance with said first and second data, so as to allow said plurality of subprocesses included in said one unit process to be successively executed; third computer-readable digital data representing a plurality of parametric conditional values for an initial condition for a decision job in each of said decision subprocesses, and a plurality of standardized jobs corresponding, respectively, to said plurality of conditional values; fourth computer-readable digital data representing a job flow constructed to allow the decision job in each of the decision subprocesses to be executed by setting up the initial condition for the decision job in accordance with the digital data of said standardized jobs; fifth computer-readable digital data representing the minimum unit subprocesses executable in accordance with common input data, wherein said minimum unit subprocesses are extracted from said plurality of minutely divided minimum unit subprocesses and classified through the analysis of said plurality of minutely divided minimum unit subprocesses; and sixth computer-readable digital data representing a job flow constructed to allow the respective jobs in said plurality of subprocesses which are executable in accordance with common input data to be simultaneously initiated and executed in parallel, wherein a job sequence for said unit subprocesses is constructed in accordance with said fifth computer-readable digital data representing said job flow to allow all of said subprocesses to be successively executed.

9. The computer program product of claim 8, wherein the job-support computer program is configured to provide a window for prompting a user to enter a condition required for executing the decision subprocess, on the screen of said computer.

10. The computer of claim 8, wherein the job-support computer program is configured to provide a window for prompting a user to enter a condition required for executing the decision subprocess, on the screen of said computer.

* * * * *